United States Patent [19]
Vicari

[11] 3,987,252
[45] Oct. 19, 1976

[54] COMPUTER CONTROLLED TELEPHONE ANSWERING SYSTEM

[75] Inventor: Ronald P. Vicari, Elmwood Park, N.J.

[73] Assignee: Graphic Scanning, Inc., Englewood, N.J.

[22] Filed: June 27, 1975

[21] Appl. No.: 591,233

Related U.S. Application Data

[63] Continuation-in-part of Ser. No. 392,634, Aug. 29, 1973, abandoned.

[52] U.S. Cl. ............................................. 179/27 FH
[51] Int. Cl.² ........................................... H04M 3/50
[58] Field of Search .................... 179/27 FH, 27 FF

[56] References Cited
UNITED STATES PATENTS

| | | | |
|---|---|---|---|
| 3,253,089 | 5/1966 | Breen et al. .................... | 179/27 FH |
| 3,341,663 | 9/1967 | Stefano ........................... | 179/27 FH |
| 3,632,889 | 1/1972 | Sikorsky et al. ................. | 179/27 FF |

*Primary Examiner*—Thomas W. Brown
*Attorney, Agent, or Firm*—James J. Cannon, Jr.; James J. Cannon

[57] ABSTRACT

A computer controlled telephone answering system to serve a large number of subscribers over a vast geographic area, utilizing a plurality of remote site trunk concentrators adjacent to each telephone company central office to reduce the number of trunk lines required to service subscribers. A central site of this answering system, serving as a facility to answer calls relayed through the remote sites, also includes a trunk concentrator to further reduce the number of trunk lines to operator positions. A computer at the central site controls the entire system, determines switching paths from a subscriber line through the concentrator, to an operator, furnishes answering information to operators and stores instructions for answering incoming messages. The logic of the system permits any operator to answer any incoming telephone call on any subscriber line in the system promptly, economically and correctly.

10 Claims, 14 Drawing Figures

TELEPHONE ANSWERING SERVICE
REMOTE SITE EQUIPMENT

FIG. 3 SYSTEM BLOCK DIAGRAM TELEPHONE ANSWERING SERVICE

OPERATOR POSITION BLOCK DIAGRAM
WITH STAND ALONE CRT'S

TELEPHONE ANSWERING SYSTEM
CENTRAL SITE CONCENTRATOR

RING MUX

COMPUTER CONTROLLED TELEPHONE ANSWERING SYSTEM

This application is a continuation in part of prior application Ser. No. 392,634 filed on Aug. 29, 1973, now abandoned.

BACKGROUND OF THE INVENTION

1. Field of the Invention

This invention pertains to a computer controlled telephone answering system and more particularly to a computer controlled telephone answering system covering a wide geographic area based on a plurality of remote site and central site trunk concentors which minimize and optimize the number of trunk lines required in the operation of a telephone answering service. The trunk concentrator includes analog, single wire switching system using analog switches in matrix form which enable the telephone answering system, under computer control, to determine a free path from the input side of each sequential analog switching matrix to the output side and eventually to a computer terminal of the operator who will answer the call. The system includes: remote site concentrators and central site concentrators, which reduce the number of trunk lines necessary to connect subscriber telephones to a central site answering service office; a special purpose digital logic for switching control, command verification, ring detection and data communications to and from the central answering service office; a central computer for control of the system and storage of subscriber data and messages; and an operator console including a computer terminal and display for operator answering of individual calls processed by the system.

2. Description of the Prior Art:

Telephone answering systems are well known in the prior art and need not be described specifically here.

The prior art also discloses a number of switching systems for minimizing the number of trunk lines required between a telephone company central office and the switchboard of a telephone answering service. U.S. Pat. No. 3,002,054, as an example, discloses a trunk concentrator for telephone answering service for installation and operation in a telephone company central office which enables a reduction in the number of trunks required to connect each subscriber line to a remote telephone answering service. It is uncertain, however, what level of reduction occurs within such a system and whether the concentrator can be economically utilized in large scale answering systems covering a wide geographic region and numerous telephone company central offices. It also appears that this system requires a conventional switchboard and conventional operator positions, a limitation not necessitated in the system of the present invention.

The system of the present invention is based upon a number of statistical factors observed in the study of a telephone answering system. A telephone answering service has a relatively large number of subscribers whose telephone lines are connected to the answering service lines at a telephone company central office. For every 512 subscriber lines so connected, only a small percentage will be in use at any one time. For every 512 subscriber lines served by a telephone answering service, statistics indicate that only eight of said lines are active at peak times, and as few as none to two are active in non-peak times. However, in a conventional system, there must be positions on an answering service switchboard for all 512 lines. An answering service operator normally has a switchboard servicing 100 subscriber lines. With some effort, an operator can reach to the boards at either side of her position to cover another 100 or 200 lines, if she is not busy. Present telephone answering systems, however, provide no way to direct an incoming call on a given subscriber line to any operator position which is not busy. These calls must be directed to the operator position on the specific switchboard to which the subscriber's line is connected, regardless of the current workload of the operator. This results in a considerable lack of flexibility and unnecessary operating costs for a telephone answering service.

The system of the present invention is designed to minimize the number of trunks required to service the subscriber of a telephone answering service through the use of at least two trunk concentrators which are under the operational control of a computer. A first type of trunk concentrator, of which there may be more than one, is located at a remote site, perferably adjacent to a telephone company central office serving individual subscribers. For each 512 subscriber lines coming into each remote site from a single telephone company central office, there is a analog switching matrix which will switch any one of the 512 incoming lines to any one of eight outgoing trunks which transmit signals to the answering service central site. Each remote site also has a special purpose digital control unit to control and verify the operation of the analog switching matrices, a digital memory to hold temporarily command messages for forwarding to the central site of the answering service, and a digital logic for ring detection, switch control and message verification.

Each remote site of the answering service is connected to a central site at which the calls are actually answered by operators. For every 128 trunks reaching the central site, there are up to sixty-four operator positions, each of which is able to answer any one of the 128 trunks coming into the central site. To accomplish this, a central site concentrator is utilized which is a 128 by 64 analog switching matrix under the control of a central site computer. Each operator position is basically a computer input-output terminal with a keyboard, a cathode ray tube (CRT) display, and a memory and control unit. The central site computer, in addition to a control program for the entire system, also contains within its memory the pertinent information required by an operator to answer each incoming call. As the computer recognizes a call to be answered, it determines by the table look-up, which operator position if free to answer the call and sends the pertinent answering information to the operator terminal to which it will direct the call. After the operator receives the call and takes the caller's message, the operator will key the incoming message into the computer where it will be stored until subscriber calls for his messages. In this fashion, the system of the present invention minimizes the chance of operator error in answering calls, in taking messages, and in giving messages to the subscriber. It also maximizes the use of operator labor by providing a computer based retrival system rather than a manual retrival system.

The present embodiment of the system, as described herein, accomodates up to 1,024 subscriber lines at each remote site, which lines are concentrated to 16 trunk lines going to the central site. Each central site can handle, in a typical embodiment, 128 trunk lines from various remote sites; thus eight remote sites serving a total of 8,192 subscriber lines, as illustrated in the drawings; any one of which subscriber lines can be answered at any operator terminal. The flexibility of this system is impossible to achieve in any other telephone answering system.

SUMMARY OF THE INVENTION

This invention pertains to a computer controlled telephone answering system which, through the use of a plurality of trunk concentrators, is able to service a large number of subscribers over a wide geographic area, while minimizing the number of trunk lines and operators to service these subscribers. The system includes remote sites preferably located adjacent to telephone company central offices, and a central site having a computer based control system with terminals for operators who answer calls.

Each remote site serves as an entry point for the subscriber lines from a nearby telephone company central office. At the remote sites these subscriber lines enter through a standard telephone company device access arrangement. The output from this equipment then is wired to an analog switching matrix or a remote trunk concentrator. Each remote site concentrator is capable of concentrating 512 incoming subscriber lines down to a maximum eight outgoing trunk lines to a central answering service site. The remote site also contains the digital control, memory and transmission equipment necessary to operate its trunk concentrator, to determine which lines should be answered and to service the connection of subscriber lines to outgoing trunks to the central site. When a subscriber line is to be answered under computer control, a path through its analog switching matrix is determined, the signal is transmitted by an active line which exists from the the central site.

The central site serves as the actual answering location in the system. It receives incoming calls from the remote sites and, by means of a second trunk concentrator, switches an incoming call on any one of the 128 trunk lines, to any available operator position of the 64 provided in the central site under computer control. The computer at the central site also stores the relevant information required by operators to answer each call. Each operator at the central site is equipped with a computer terminal having a keyboard entry system and a cathode ray tube visual display. When the computer determines a free path from a ringing line through the remote site concentrator and the central site concentrator an operator position, it directs the control logic of each concentrator to make the necessary connections and forwards to the operator's display all the information which is operator requires to answer the call. While answering the call the operator keys in the incoming message and verifies it on her display. After completion of the call, the operator forwards the incoming message from her terminal to the central computer and is free to receive another call. The flexibility of the system of the present invention is such that, in a typical installation, any one of 8,192 subscribes lines can be answered by any one of 64 operators with each call being answered correctly and unhurriedly.

The flexibility of the present system is due to large part to the trunk concentrators. The remote site concentrators utilize 512 bidirectional eight-to-one analog switches, each of which will allow any one of eight signals to pass through it in either direction. A three level digital code is used to select the signal. Sixty-four analog switches are connected to select any one signal from 512 possible signals. Eight such 512-to-one matrices are put together to form a 512-to-8 matrix for the remote site concentrators. More than one such matrix may be used at any one site. An available free path through the matrix is determined under computer control. The trunk concentrator permits the number of trunks going to the central site to be reduced from 512 to eight or less from each remote site. An incoming call on any one of the 512 lines into a remote site concentrator can be forwarded to the central site through any one of the non-active trunks, which need not be more than eight.

Another trunk concentrator is located at the central site. In a typical configuration, each central site concentrator has 128 trunks coming in from remote sites. In some cases a small portion of these 128 trunk will be used for outgoing calls. The central site concentrator directs each incoming call on any one of the 128 trunks to any one of 64 operator positions which may be free to answer the call. Thus the central site concentrator has an analog switching matrix of 128 by 64. Basically it utilizes the same eight-to-one bidirectional analog switch, arrayed differently. Sixteen eight-to-one switches form a 128-to-1 switch. Sixty-four of these 128-to-1 sections are put together to form a 128-to-64 analog switch.

The flexibility and economic feasibility of the system of the present invention is further enhanced by the use of single wire switching in the analog matrices of the concentrators. Each incoming subscriber line has two wires. In the concentrators, one of these wires is connected to a common ground. The other wire is connected to one of the eight-to-one bidirectional analog switches, and serves to carry the audio signals. The use of this signal wire switching reduces the number of switches required in the system by one-half.

In sum, the computer controlled telephone answering system of the present invention permits in the preferred embodiment any one of 8,192 subscriber lines coming from a plurality of telephone company offices to be answered correctly and promptly by any one of up to 64 operators at a central answering service location.

The telephone answering system of the present invention has other applications besides the traditional telephone answering service. For example, it may be used as a private branch exchange serving a large office or company, through its concentrators, and the answering service need not be physically located in the office it serves. It may also be used as a telephone order system for mass merchandising company receiving incoming orders from a vast georgraphic area at one central location.

It is, therefore, the principal object of this invention to provide an improved telephone system for use by telephone answering services or others who receive a large volume of incoming calls.

It is a further object of this invention to provide an improved trunk concentrator analog switching system for use with a telephone answering system.

It is a further object of this invention to provide a new and improved trunk concentrator analog switching system for minimizing the number of trunk lines required to answer a finite number of subscriber telephones, thereby reducing the trunk costs of a telephone answering service.

It is a further object of this invention to provide a telephone answering system which enables any incoming call to appear at any operator position and be answered correctly and promptly.

It is still a further object of this invention to provide a computer controlled telephone answering system in which connections between an incoming call and the answering operator are achieved by means of a computer controlled analog switching system.

It is yet another object of this invention to provide a telephone answering system in which the information required to answer an incoming call to a subscriber is stored in a computer and delivered to the operator who is assigned to answer the call, and in which the incoming message taken by the operator is inputted and stored in the computer until called for by the subscriber.

Further objects, features and advantages of the present invention will become readily apparent from reading the accompanying detailed specification which will be written with reference to examples of embodiments shown in the attached drawings.

DESCRIPTION OF THE PREFERRED EMBODIMENT

Figure 1:
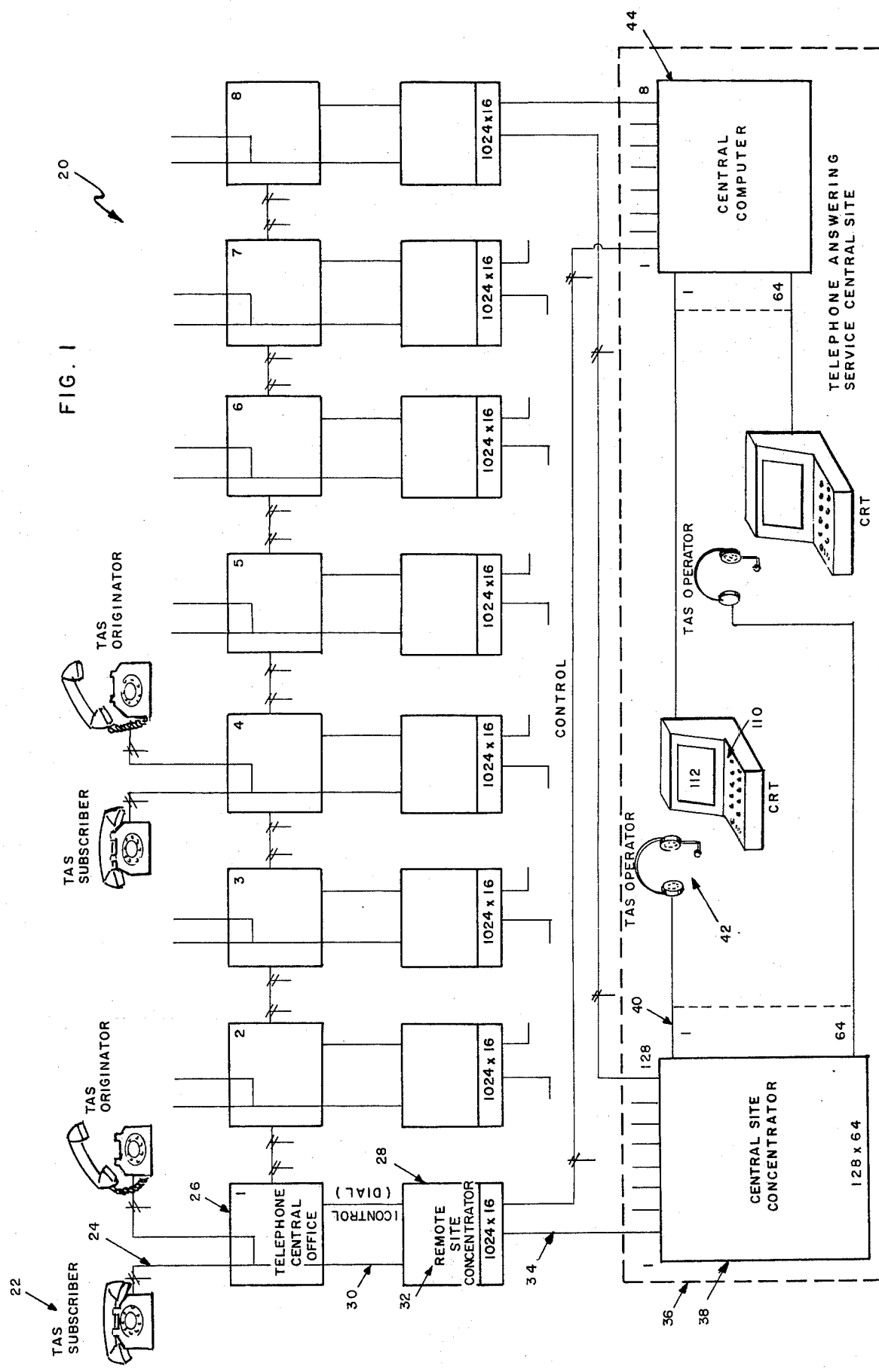
FIG. 1 is a schematic illustration in block diagram form of a preferred embodiment of the computer controlled telephone answering system of the present invention illustrating the interrelationship of its major subsystems.

Referring now to the drawings, and in particular to FIG. 1, wherein like reference numerals refer to like components, the computer controlled telephone answering system of the present invention, designated generally by reference numeral 20, is illustrated diagrammatically in a preferred embodiment. The invention described herein is more particularly concerned with the analog switching and control systems required to handle incoming calls delivered to a telephone answering service over telephone company lines through standard telephone company equipment.

All telephones are connected through switching circuits in one or more telephone company central offices. Subscribers to a telephone answering service and connected to the answering service by the extension of a pair of wires from the subscriber's position on the telephone office frame to a device access arrangement provided by the telephone company at the location of the answering service. In the present state of the art, a telephone answering service usually serves only one or more collocated or geographically proximate telephone company central offices to be economically feasible and avoid the high cost of trunk lines. The telephone answering system 20 of the present invention overcomes this economic limitation through the means described hereinafter.

As illustrated in FIG. 1, the system 20 serves telephone answering service subscribers 22 whose telephone lines 24 are connected normally to a telephone company central office 26. When a subscriber 22 desires to be connected to a conventional telephone answering service, a second pair of wires is connected from the telephone company central office to the office of the answering service. Depending on applicable tariffs, which vary from community to community, the subscriber may be liable for a mileage charge for a trunk line to the answering service. System 20, to minimize such possible trunk line costs, includes one or more remote site units 28, each of which is located in near proximity to a telephone company central office 26. Each subscriber 22 is connected to a remote site unit 28 through a trunk line 30, running from the central office 26 to the remote site unit 28. In the preferred embodiment, illustrated in the drawings, 1,024 subscribers 22 are connected to each remote site unit 28 by separate trunk lines 30. Within each remote site unit there is a control unit and an analog switching matrix or trunk concentrator in which these 1,024 trunk lines 30 are concentrated by the remote site concentrator 32, as hereinafter described, down to 16 or less trunk lines 34 which lead to a telephone answering service central site 36.

In the preferred embodiment illustrated in the drawings, the central site 36 serves remote site units 28: Hence, 128 trunk lines 34 enter the central site, where they are then concentrated by a central site concentrator and control unit 38, as hereinafter described, to 64 trunk lines 40 linked to operator position 42 under the control of a central site computer 44. Central site computer, in the preferred embodiment, is model SPC-16/65, manufactured by General Automation, Anaheim, Calif. Central site computer 44 serves to control system 20 by determining analog switching paths through the analog switching matrices of the remote site concentrators 32 and through the central site concentrator 38 to operator position 42, while supplying from its memory answering information to operator positions 42 and storing messages accepted at operator positions 42 for later delivery to subscribers 22. The individual units, subsystem and operation of computer controlled telephone answering system 20 will be disclosed in detail in the succeeding sections of this specifications.

Figure 2:
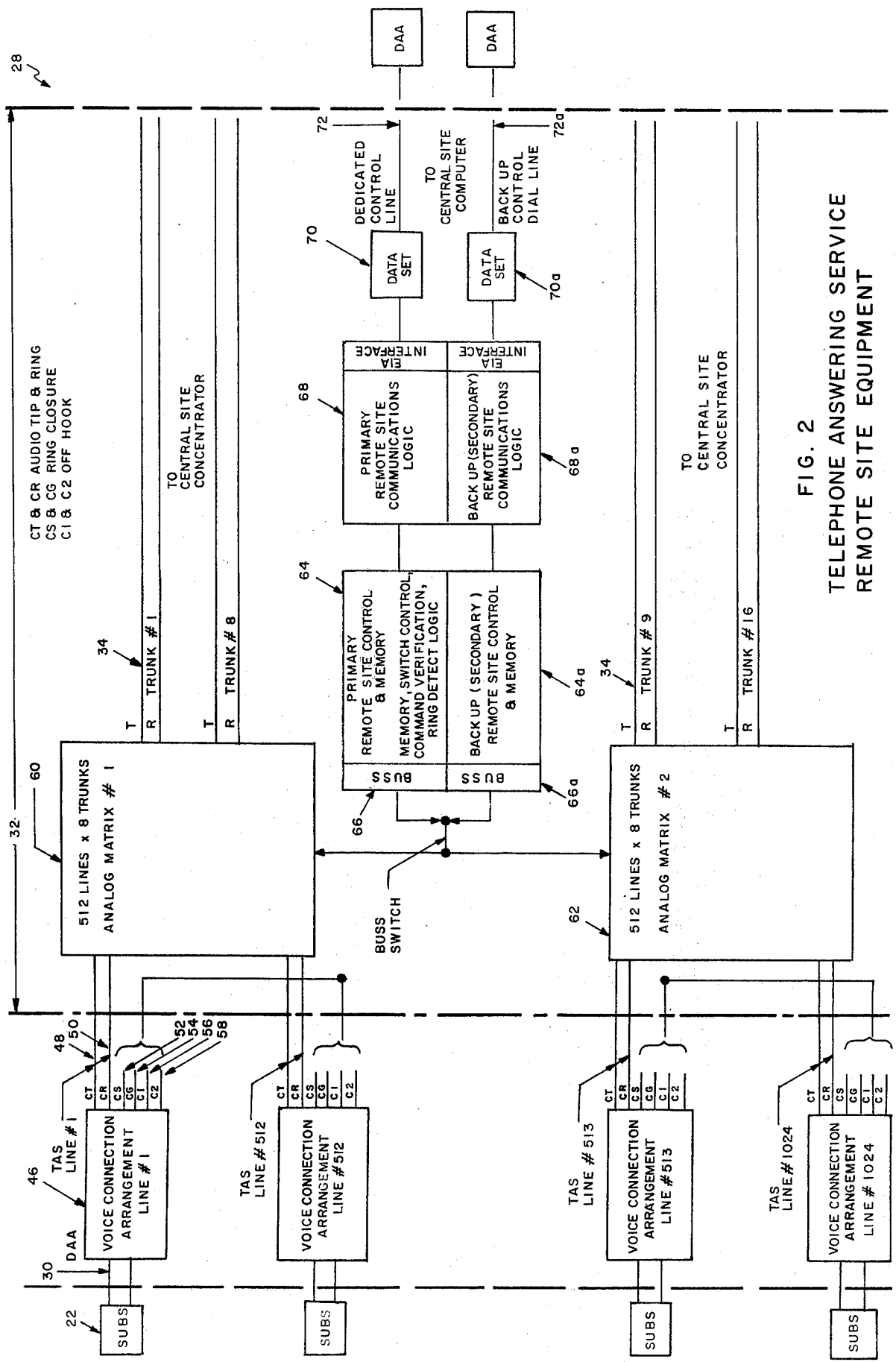
FIG. 2 is a block diagram illustrating the physical equipment at a remote site of the computer controlled telephone answering system of FIG. 1 and the interrelationship of the major component units of this equipment.

Referring now to FIG. 2, wherein there is illustrated a block diagram of physical equipment located in a remote site unit 28 of telephone answering system 20, the subscriber lines 30 enter the remote site unit 28 through a standard telephone company device access arrangement equipment 46, such as a CD-6 (Bell System) voice connection or equivalent. All wires 48 through 58 are connected to terminals located within the remote sites unit 28 as described hereinafter. The remote site unit 28 includes, in the embodiment illustrated in the drawings, a remote site concentrator and control unit 32 consisting of two analog switching matrices 60, 62, each of which can accept up to 512 subscriber lines 30 and concentrate the same to a maximum of eight outgoing trunk lines 34, in such a way that any one of the 512 subscriber lines 30 may be switched into any one of the eight outgoing trunks 34 to the central site 36. The remote site unit 28 includes a remote site digital control and memory unit 64, which stores and retrieves digital messages pertaining to switch control, command verification and ring detection, connected to the analog matrices by a buss switch 66. The remote site digital control and memory unit 64 is further illustrated in FIG. 13. The remote site unit 28 also includes communication logic 68 to control digital data transfer to and from the central site computer 44 through a commerically available VADAC 3400 data set 70 over a dedicated trunk line 72. All the digital control, memory and communciation units in the remote site 28 are duplicated by secondary systems 64a through 72a in the event of failure of the primary system. The back-up trunk line 72a is an automatic dial line which is switched in automatically upon detection of a failure in the primary system. The sixteen outgoing trunk lines 34 from analog switching matrices 60, 62 go directly to the central site concentrator and control unit 38. The equipment in a remote site unit 28 can fit into two standard cabinets of about 45 cubic feet each and requires no personnel for its operation. Hence the remote site unit 28 can be conveniently located physically adjacent to a telephone company central office 26, and through its 512-to-8 reduction in trunk lines, it can significantly reduce the cost of connecting subscriber lines 24 to an answering service central site 36. All equipment shown in FIG. 2 under the general reference numeral 32 was specifically designed and built for system 20, with the exception of the Vadac sets 70.

Figure 3:
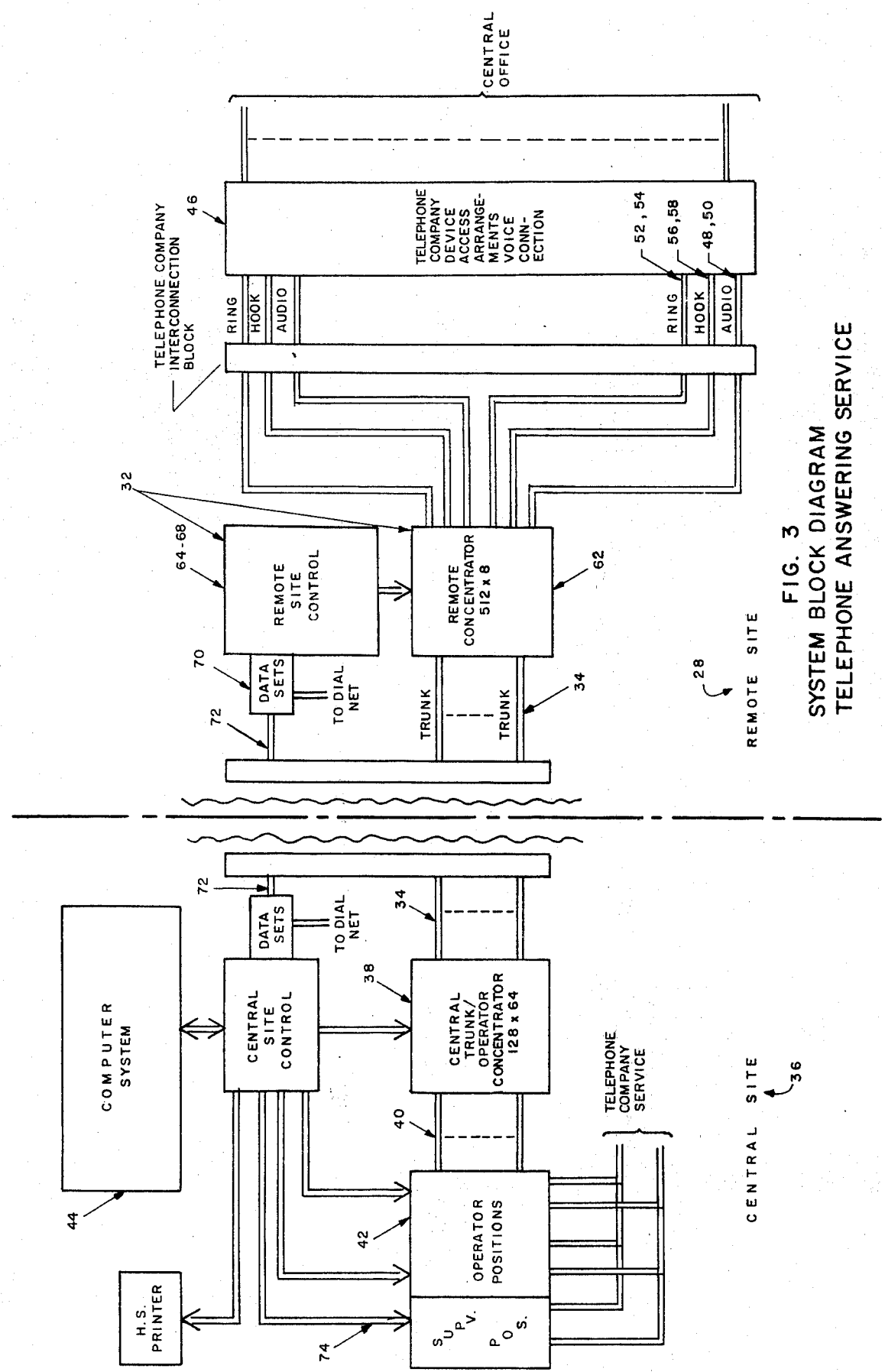
FIG. 3 is a block diagram illustrating the system trunk connections between a remote site and the central site of the system of FIG. 1.

FIG. 3 illustrates in block diagram form the telephone line connections within both the remote suit unit 28 and the central site 36.

Figure 4:
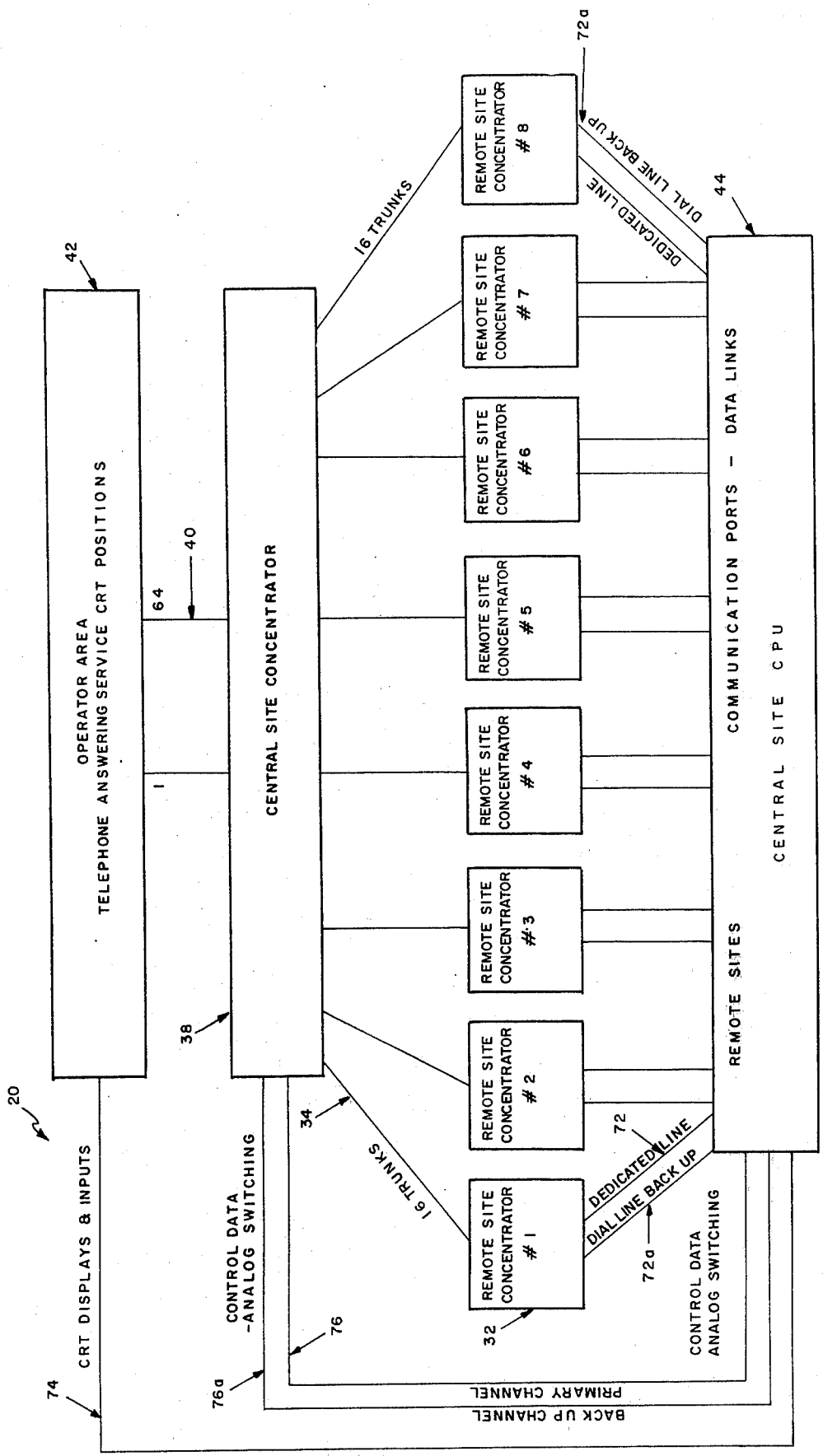
FIG. 4 is a functional block diagram illustrating the communication links between the operator positions and the other subsystems of the system of FIG. 1.
Figure 5:
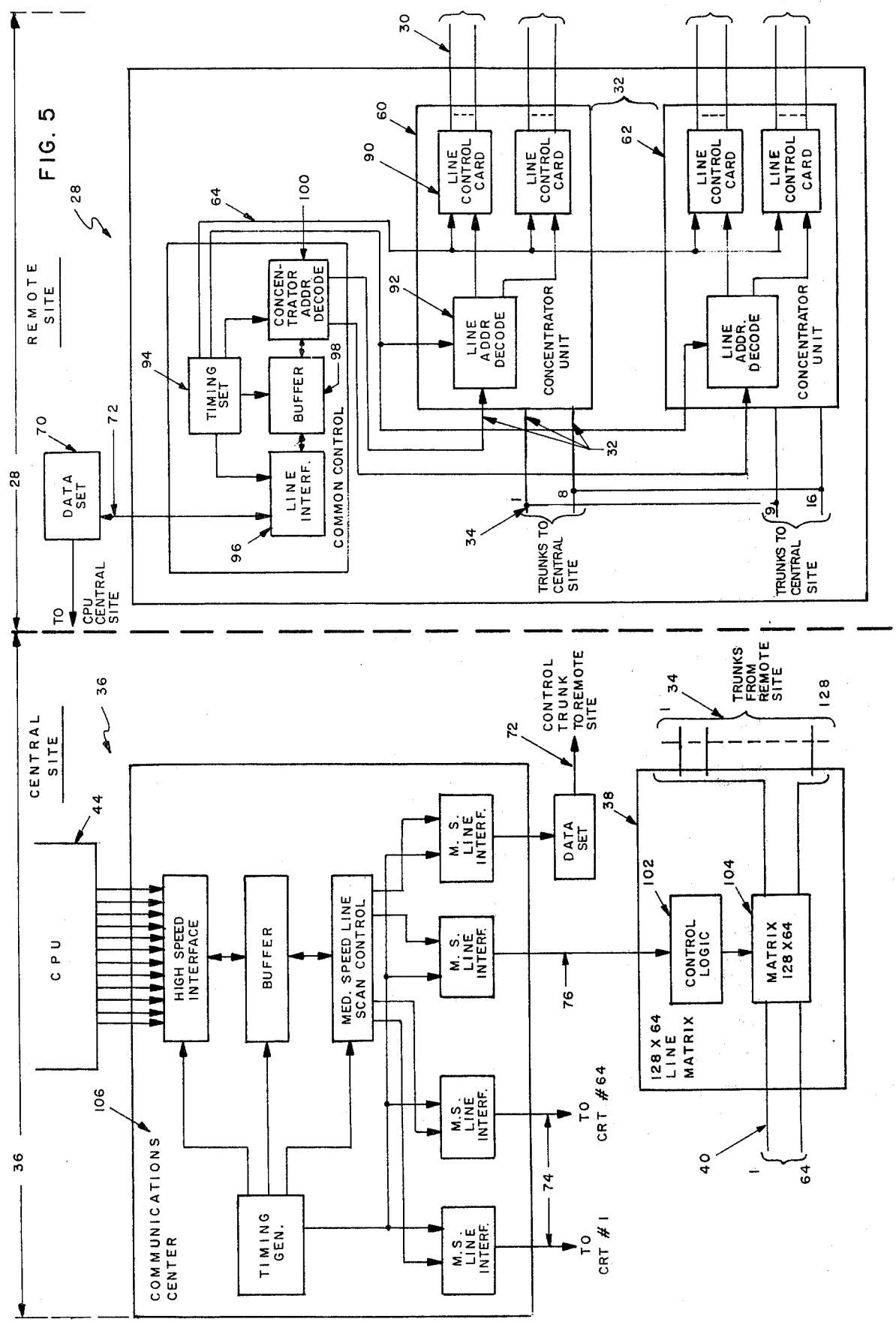
FIG. 5 is a functional block diagram illustrating the system control units at the remote and the central sites in the system of FIG. 1.

FIG. 4 illustrates the communciation interfaces of system 20 in a functional block diagram. System 20 is basically under the control of a central site computer 44 located at the central site 36. Digital control messages are sent to the remote site concentrator and control unit 32 through communications logic 68 over dedicated trunk lines 72. Remote site concentrators 60, 62 each have up to sixteen trunks 34 delivering telephone calls to the central site concentrator and control unit 38, which contains a 128-to-64 analog switching matrix which functions electronically in a similar fashion to the analog switching matrices 60, 62. After the control unit 64 (illustrated functionally in FIGS. 2, 3, and 13) of the remote site unit 32 has determined that a subscriber line 30 is ringing and has rung the number of times stored in the remote site control and memory, the remote site unit 64 sends a digital message to the central site computer 44 to that effect. The computer 44, by a table look-up, determines a free path through one of the remote site analog switching matrices 60, 62 of a remote site concentrator 32, to a trunk line 34 to a central site concentrator 38 and through central site concentrator 38 to a trunk line 40 from central site concentrator 38 to an available operator position 42. After the central site computer 44 determines such paths, it issues digital data messages to the remote site control unit 64, via control line 72, and the central site concentrator 38, via control line 76, to set switches to enable the ringing subscriber line 30 to be switched to an available operator position 42. These control messages from the central computer 44 to the remote control unit 64 and to the central site concentrator control unit 104 are sent over the digital data lines 72 and 76 respectively (FIG. 5). At the same time the central site computer 44 notifies the operator position 42, via control line 74, which is to receive the incoming call that the call will be switched to that particular position, and furthermore the central site computer 44 will send to the operator position 42, for its memory, identifying information such as the subscriber's name, telephone number, i.e., what line is to be answered, and answering instructions. This information is forwarded digitally to the operator position 42 over a control line to a controller 114 (illustrated in FIG. 7) and then to the operator position 42 for display on cathode ray tube visual display 112 (FIG. 1). When the operator is ready to answer the call, the operator signals the central site computer 44 by a function key on her keyboard 110. Upon receipt of this digital message, the computer sends a switching command to the remote concentrator and control unit 32 through the remote site control unit 64. The connection through to the operator is made and the operator answers the call. As the operator receives from the caller incoming information to be retained and later forwarded to the subscriber, she keys this information into the controller 114 following a format on the cathode ray display tube 112. The keyed-in information also appears on the cathode ray tube display 112 for visual review and correction by the operator. After the call is completed and the operator has verified the message, she signals the central site computer 44 and controller 114 to receive and send the message, respectively. The computer 44, on a time available basis, asks the controller 114 for the message. The operator, meanwhile, is available to receive another call.

FIG. 5 illustrates in block diagram form the functional logic in the remote site unit 28 and central site 36. The remote site unit 28, in this embodiment, includes subscriber lines 30 entering the analog switching matrices 60, 62 of the remote site concentrator 32 on line control cards 90 (illustrated in detail in FIGS. 11, 12 and 13). The line address decoder 92 is also on these cards. Trunk lines 34 to the central site concentrator 38 exit from line control cards 90. The remote site control logic 64, 68 includes a timing set 94, a line interface 96, a buffer memory 98 and a concentrator address decoder 100. A data set 70 serves as a communication link between the remote site unit 28 and the central site 36. FIG. 13 illustrates in block diagram the interrelations among the functions of remote site control unit 64.

The central site unit 38 is contained in three functional units. The central site concentrator and control unit 38, including control logic 102 and analog switching matrix 104, functions in a manner similar to the remote site unit 28 insofar as its control logic 102 and its analog switching matrix 104 is concerned. The central site computer 44 has its own logic. The central site communications center 106 controls all the data transfers within the system. Communications center 106 is basically a model DMA multiplexer available from General Automation for use with its model SPC-16/65 computer. All equipment shown in FIG. 5 under the general reference numeral 38 was specifically designed and built for system 20.

Figure 6:
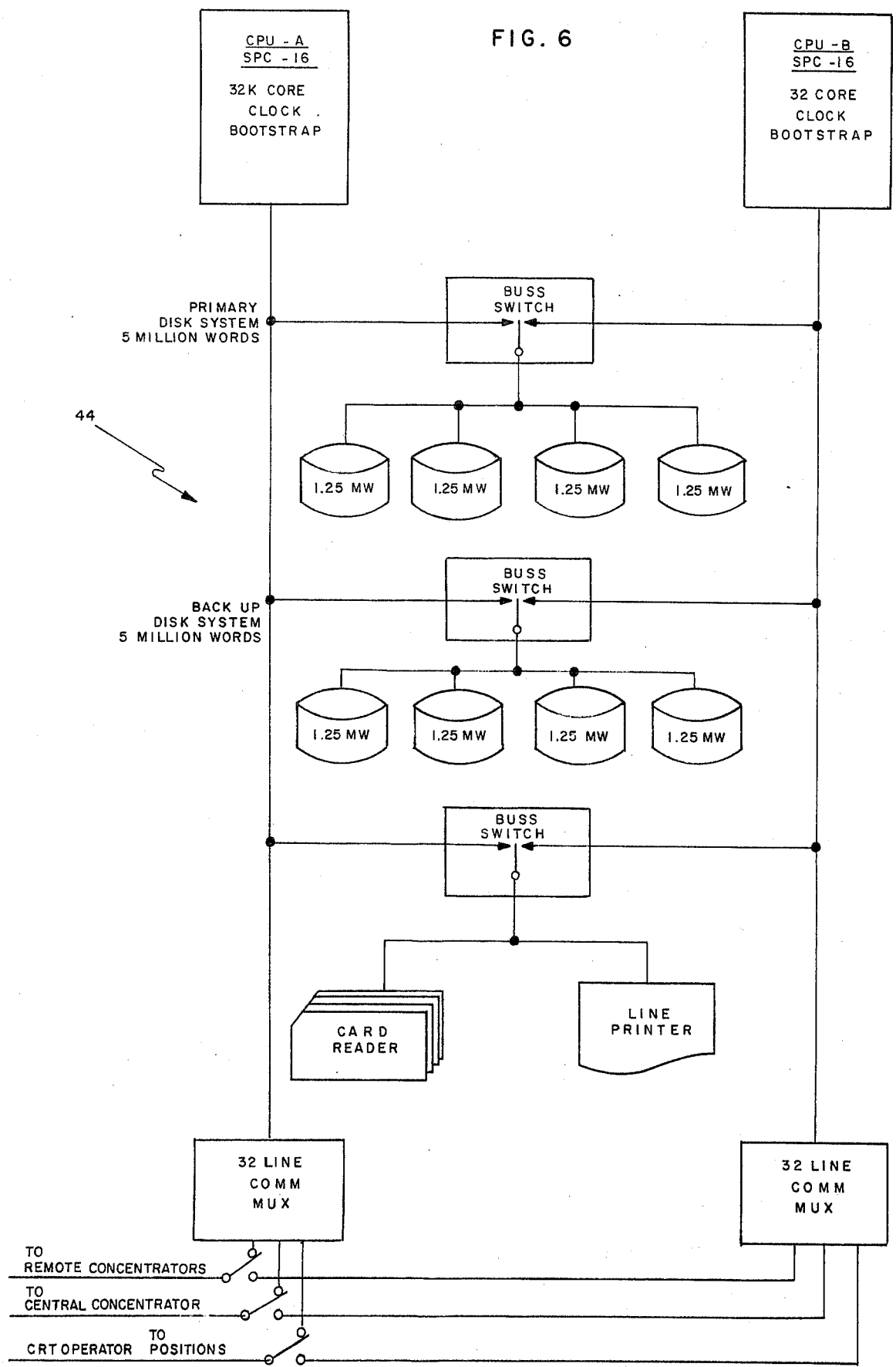
FIGS. 6 and 7 are block diagrams of the central site computer system of FIG. 1 and the interfaces to the operator terminal units.
Figure 7:
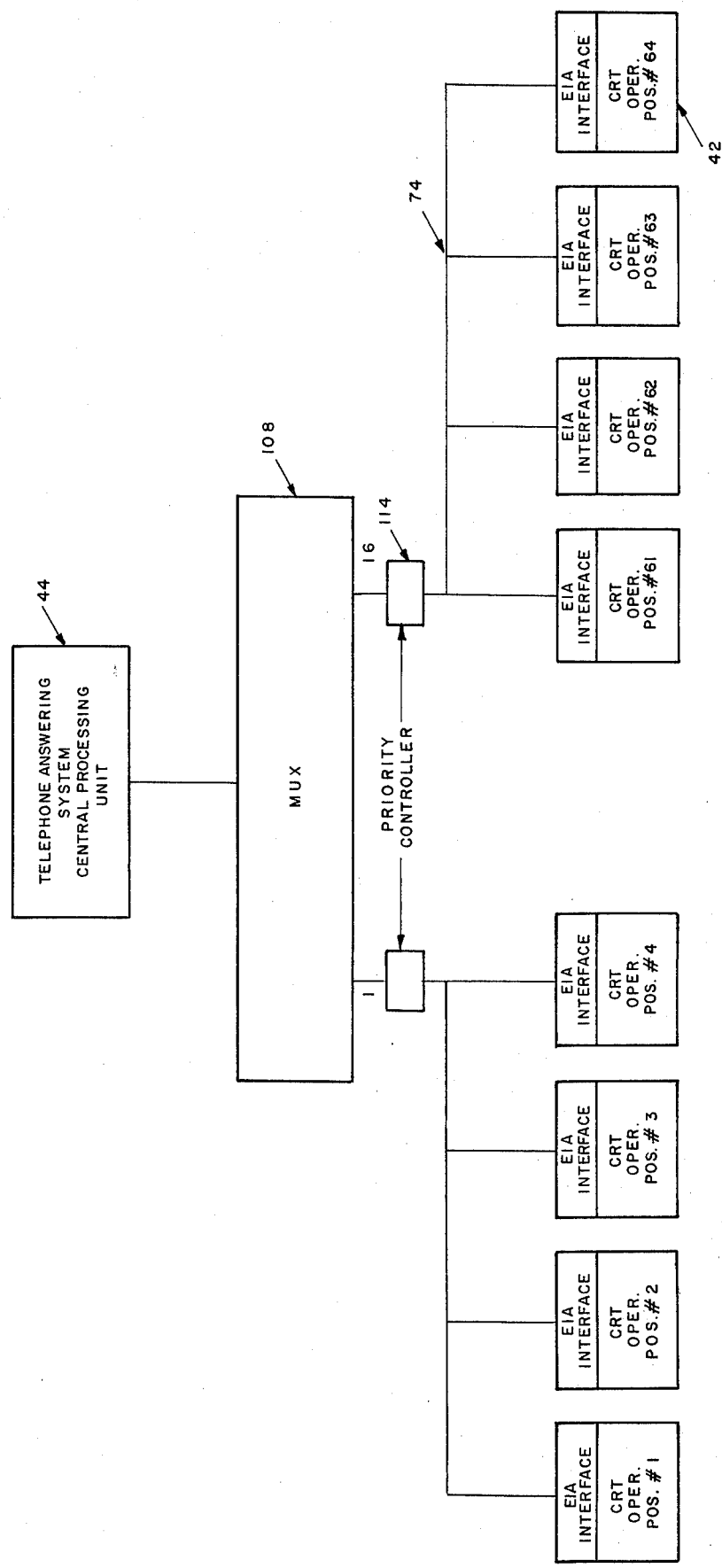
Figure 8:
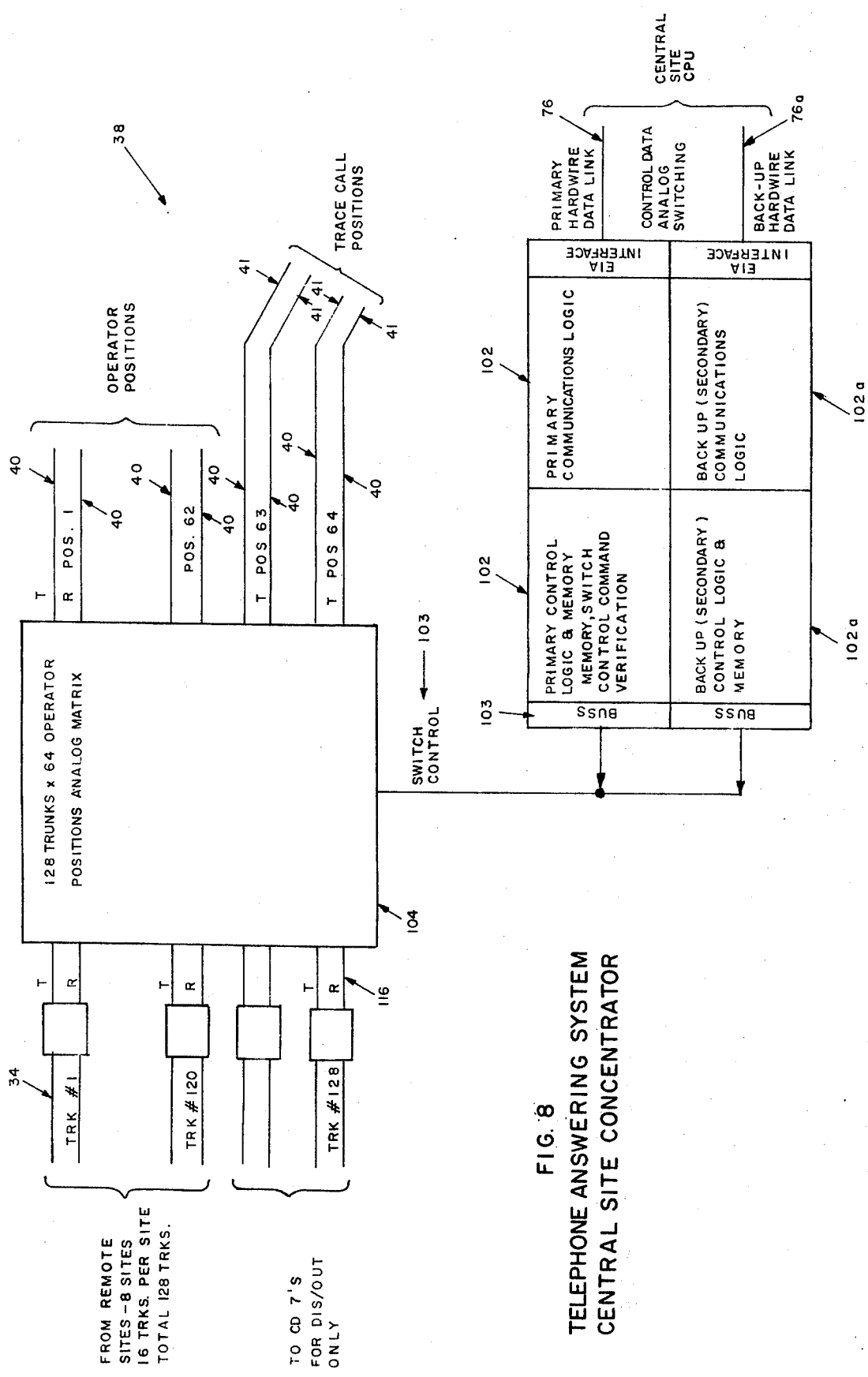
FIG. 8 is a functional block diagram of the central site concentrator of the system of FIG. 1.

FIG. 6 illustrates the configuration of the central site computer 44, which as stated previously is a model SPC-16/65 made by General Automation, Anaheim, Calif, and its major component parts and relationships thereto as further described in configuration with FIGS. 7 and 8. The principal feature of computer 44 is the vast memory capacity for storing the subscriber information required to be sent to the operator positions 42 so that any operator can answer any call. Additionally, the computer 44 must store all incoming messages for subscribers taken by the operators until they are called for by the subscribers.

FIG. 7 illustrates in block diagram form the relationship of the operator positions 42 to the central computer 44. Operator positions 42 are interfaced through multiplexer 108, four to a channel. Each operator position 42 contains a keyboard 110, a cathode ray tube visual display 112 and a telephone head set. Each group of four operator positions is served by one or more controller units 114 which refresh the cathode ray tube visual display screens 112 and serve as buffer memory. Each controller 114 is connected directly to the multiplexer 108. Multiplexer 108 is the DMA model commercially available from General Automation and designed to operate with the SPC-16/65. Computer 44 also available from General Automation. The disk memory units 101 illustrated in FIG. 6 are the Caelus model 303 units. The card reader 103 is the model M200 of Documentation. The line printer 105 is the model 2100 of Talley Industries. The keyboards 110 and controllers 114 are the model MRD 780 made by Applied Digital Data Systems.

Figure 14:
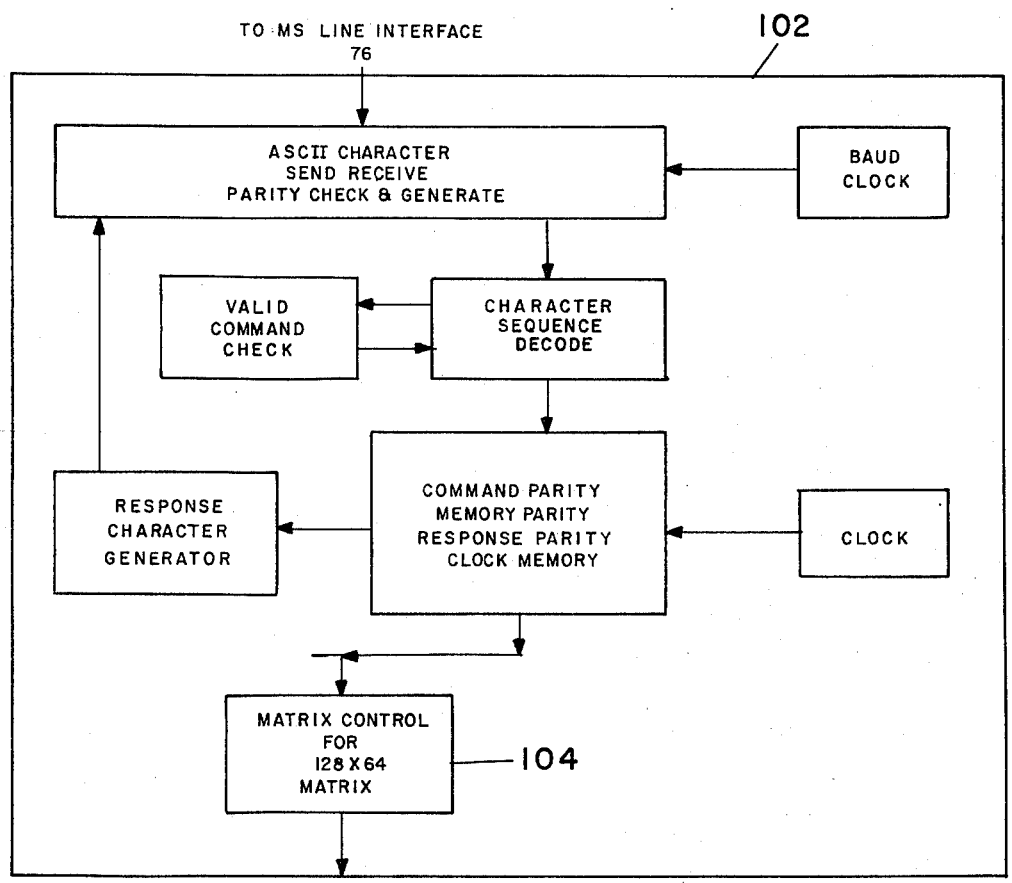
FIG. 14 is a block diagram of the central site control unit.

FIG. 8 illustrates in detail the functional configuration of the central site concentrator and control unit 38. Central site concentrator and control unit 38 includes an analog switching matrix 104 which, in the embodiment illustrated in the drawings, is a 128-by-64 matrix. Matrix 104 further concentrates the 128 trunk lines 34 from the remote site concentrator 32 to a maximum of 64 lines 40 to the operator position 42. The number of operator positions 42 and the lines 40 to operator positions can vary according to the volume of calls received into system 20. Some lines 41 exiting from switching matrix 104 can be used for trace calls, the number varying according to the volume of such calls. The control logic 102 for central site concentrator and control unit 38 is similar to that for the remote site unit 28 except for the ring detection logic which is not in the central site control logic 102, as illustrated in FIG. 14. Central site control logic 102 has a buss switch 103 and is connected to computer 44 over data line 76. It also has a back-up logic 102a, 106a and a back-up dial line 76a. Since the central site 36 is manned by human operators, some configurations may reserve up to sixteen of the trunk lines 34, at least one per remote concentrator 32, for outgoing calls originated by the operators, said trunks hereinafter referred to by the reference numeral 116. Lines 116 would have automatic dial feature and would exit from the central site concentrator 38 through standard telephone company CD-7 equipment or equivalent.

Figure 9:
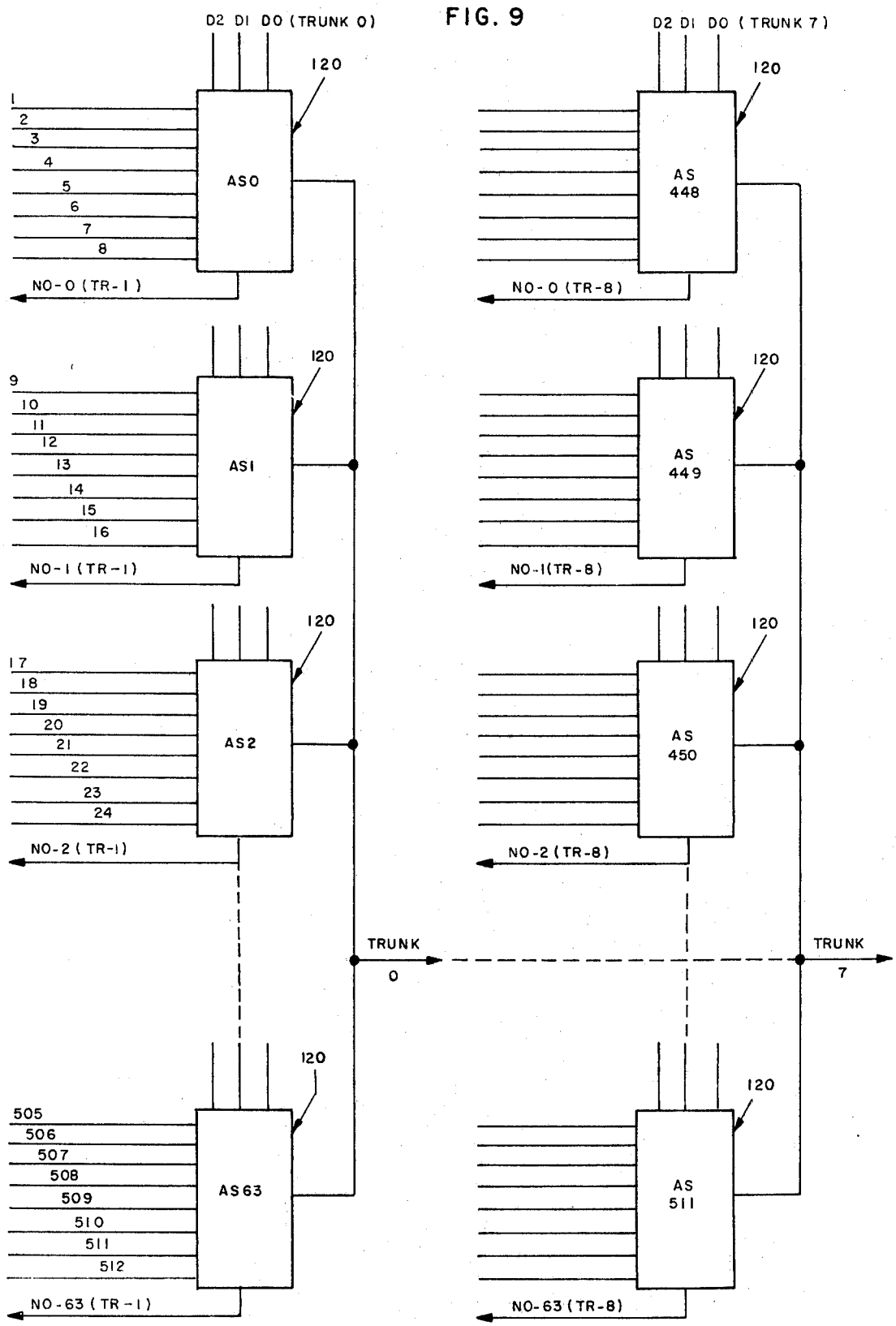
FIG. 9 is a schematic illustration of the analog switch as utilized in the remote site concentrator of the system of FIG. 1.

FIG. 9 illustrates the use of an eight-to-one bidirectional switch 120 in the analog switching matrices 60 and 62 of the remote site concentrator 32 and of the central site concentrator 38. Analog switch 120 is a commercially available AM3705 eight-channel MOS analog switch. Each analog matrix 60, 62 is a 500 twelve-to-eight bidirectional analog switch built from 512 individual analog switches 120. Each eight-to-one analog switch 120 will allow any one of eight signals to pass through it in either direction. The signal is selected by a three bit digital code. Each switch 120 also has an enable pin which permits the utilization of a large number of such switches 120 to form the analog matrices 60, 62 of the remote concentrator 32 and the analog matrix 104 of the central site concentrator 38. FIG. 9 illustrates in a fragmentary view how 64 of said analog switches 120 are connected to select any one signal from 512 lines. Also illustrated in FIG. 9 is the use of eight of these 500 twelve-to-one sections to form each 500 twelve-to-eight analog switching matrix 60, 62 in the remote site concentrator 32.

The analog matrix 104 of central site concentrator 38 can switch any one of 128 lines 34 into any one of 64 lines 40 to the operator position 42 (FIG. 8). It uses the same analog switching technique and analog switches 120 as the remote site concentrator 32 but is arrayed to form its 128-to-64 matrix. Each section will have 128 eight-to-one analog switches 120 forming a 128-to-8 switch. Eight such sections are required, thus utilizing 1,024 switches 120 in the complete matrix 104.

Figure 10:
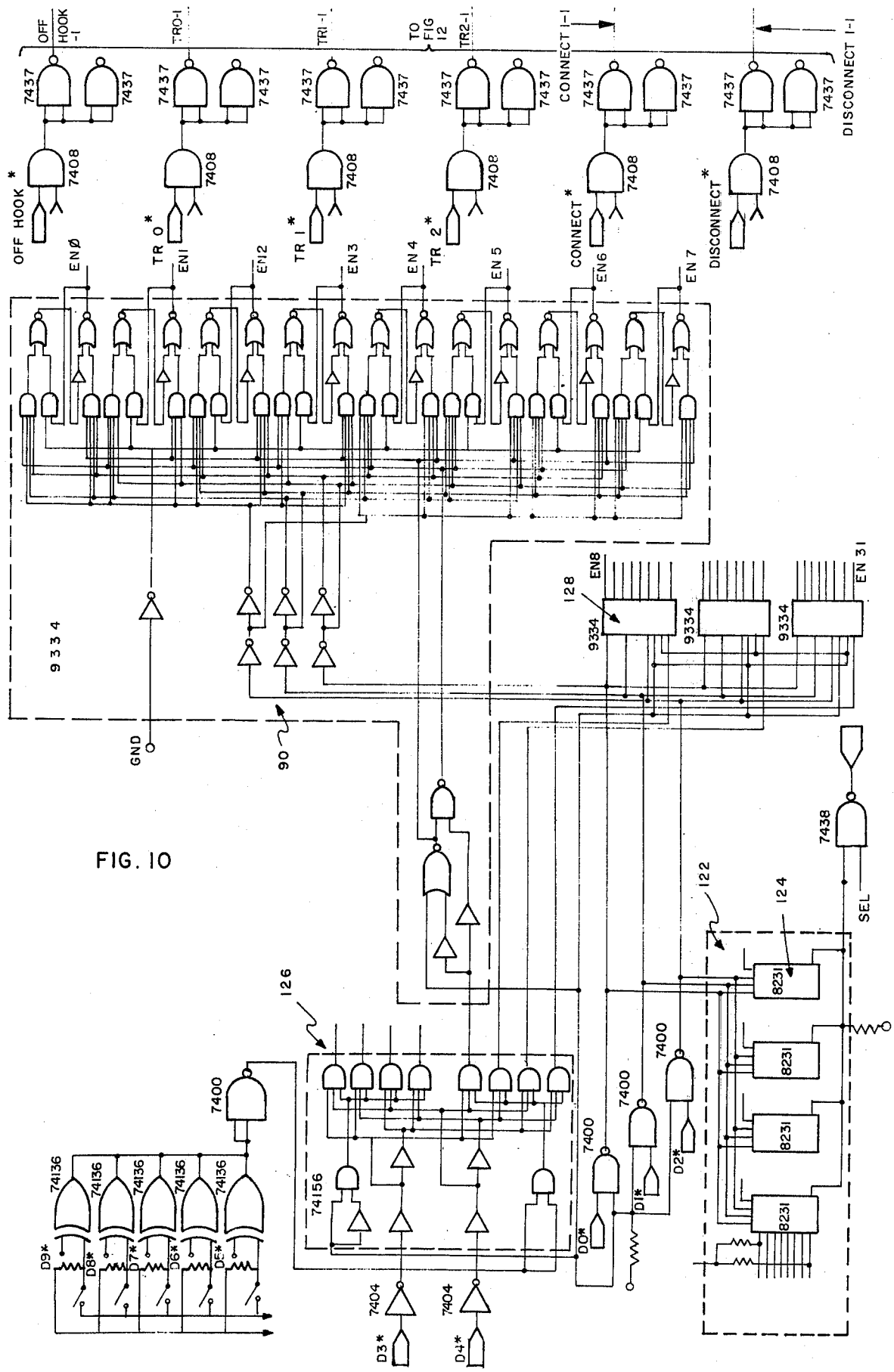
FIG. 10 is a schematic drawing of the control circuit on a line control card serving 32 subscriber lines entering the remote concentrator of FIG. 1.
Figure 11:
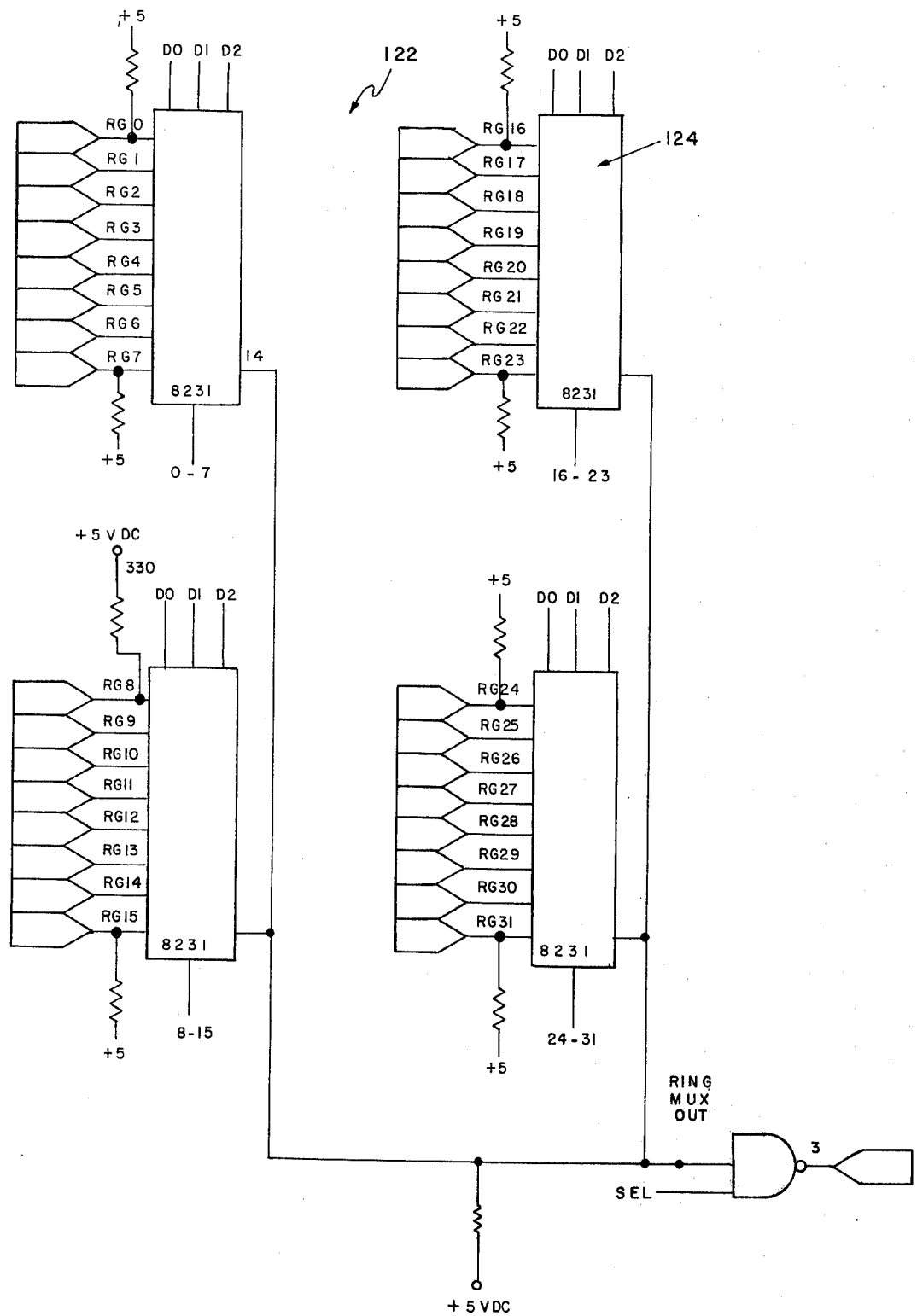
FIG. 11 is a schematic drawing of the ring multiplexer on the control card of FIG. 10.
Figure 12:
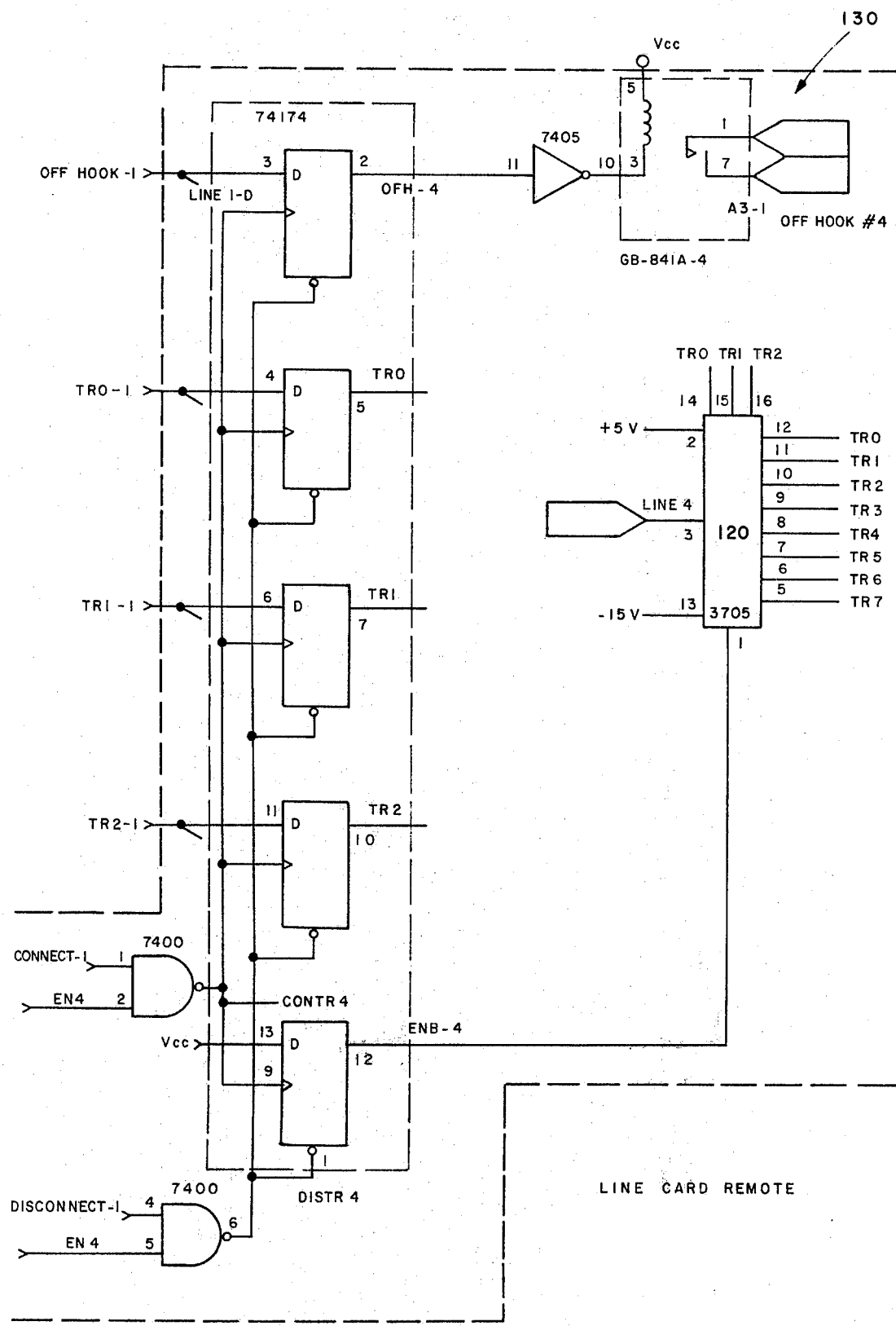
FIG. 12 is a schematic illustration of a line control card illustrating the input of one subscriber line to the 8-to-1 bidirectional analog switch as it appears on a line card in the remote concentrator, illustrated in FIG. 10.
Figure 13:
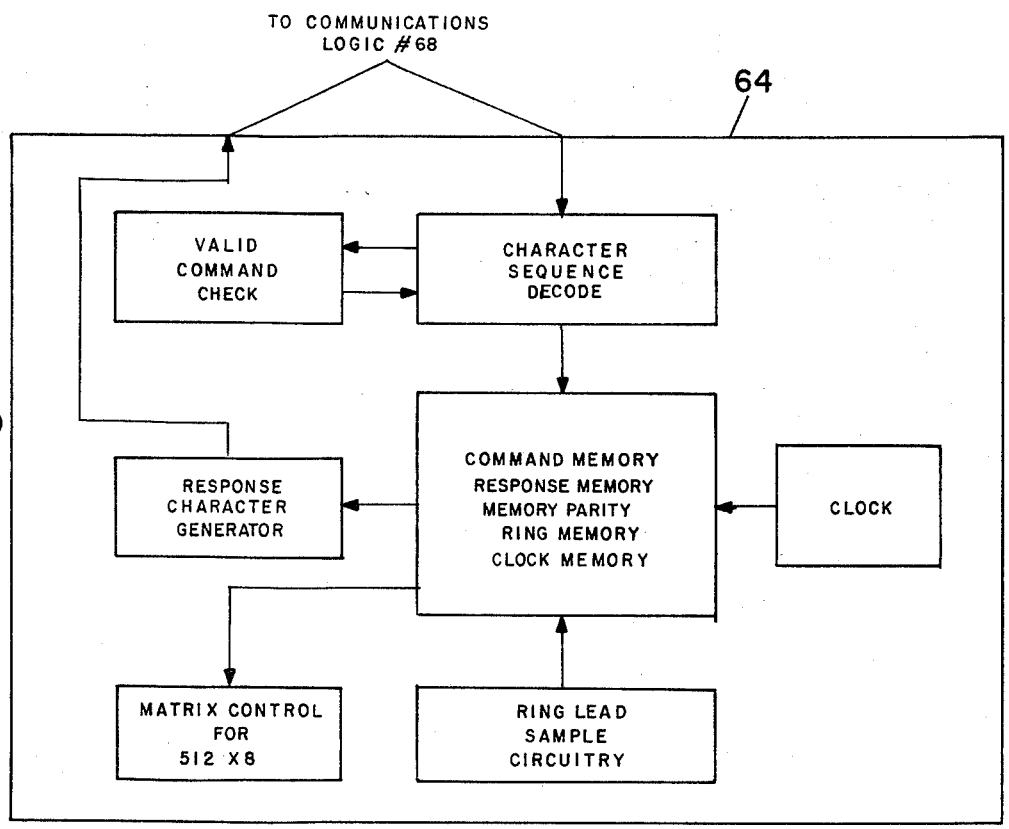
FIG. 13 is a block diagram of the remote site control unit and memory.

FIGS. 10, 11 and 12 illustrate one of the remote line cards 90 used in the remote site concentrators. Each remote line card 90 has two primary functions. These are:

a. to provide ring detection capabilities for monitoring the presence of incoming calls on each subscriber line 30; and b. to provide the matrix address decoding necessary for accessing any of the 512 AM3705 analog multiplexers 120 illustrated in FIG. 9.

The later function of the remote line card 90 therefore allows the central site computer 44 to switch any one of the 512 incoming subscriber lines 30 to any one of the eight outgoing trunks via the remote line control card 90.

As illustrated in FIG. 10, 11 and 12, the concentrator 32, 38 operate on the principle of a single wire switching. All the ring wires 50 are connected to a common ground which, in the remote site concentrator 32, serve in the ring detection logic 122. The tip wires 48 serve as inputs to the analog multiplexer switch 120. The high impedance of switch 120 enables an analog audio signal to pass in both directions over the single tip wire 48.

Each remote line card contains sufficient electronics for accessing any one of 32 AM3705 analog switches 120 illustrated in FIG. 9. Each 512 × 8 matrix 60, 62 of the type shown in FIG. 2, therefore, contains sixteen such remote line cards 90. FIG. 10 shows one such remote line card 90 minus the thirty-two analog switches 120 and their associated electronics. FIG. 11 is a more detailed representation of the ring detect logic 122 shown also in FIG. 10. FIG. 12 shows one of the thirty-two analog switches 120 and its associated electronics which are present on each remote site line card 90.

The function of the ring detect logic circuit 122 may be described as follows

FIG. 2 shows that the telephone company's standard access device 46 (CD-6 or similar) delivers ring information to the remote site concentrator and control unit 32 of the telephone answering system 20, at which point said ring signal enters line control card 90 as described supra. This information is in the form of a switch closure between ground and one of the RG leads shown in FIG. 11. That is to say, when a call to a subscriber is received at the telephone company, a switch closure is implemented which shunts the appropriate RG lead to ground. There are, of course, 512 such leads; 32 to each of 16 remote line cards 90. As shown in FIG. 11, the RG leads are inputs to an eight-to-one multiplexer 124. Any of the eight input lines may be connected to the output by applying the proper binary code, D0 D1 D2, and by enabling the analog switch at pin 10. In this particular application the remote control card (FIGS. 5 and 13) imposes a 10 bit binary code D0–D9 on the remote site line card 90. Bits D0–D2 are used in the ring detect to address one of eight input lines. Bits D3, D4 are sent through a two-line-to-four line SN74155 decoder 126 (FIG. 10) to enable one of the four eight-line ring detection circuits 122. Bits D5–D9 are used to enable one of the 16 remote line control cards by means of an enable signal (SEL) sent to the SN74155 decoder 126 and to the output gate of the ring detection circuit 122. Hence by sequencing bits D0–D9, each ring line from the 512 subscribers is checked for 0 volts. A ringing line will thereby be gated to the remote site control card so that the number of rings may be counted or so the termination of ringing may be reported. Any line not ringing will, of course, go unnoticed because each input is tried to 5 volts through a 330 ohm resistor.

In addition to controlling the address of lines to the ring detection logic 122, bits D0–D9 are also imposed on four eight-bit Fairchild 9334 addressable latches 128 as shown in FIG. 10. Each of the 32 digital outputs from these latches is used to enable one of the 32 AM3705 eight channel analog switches 120 via their associated circuitry. A discussion of the addressing circuits is given below.

FIG. 12 shows one of the 32 eight channel analog switching circuits 130 present on each remote line card 90. All inputs to this portion of the remote site line card are sent from the central site computer 44, through the remote site control card, and are imposed on the buffer gates 127 shown in FIG. 10.

The logic of the sixteen control cards in the remote site concentrator and control unit 32 (32 of such cards if two analog matrices 60, 62 are present) is not illustrated in detail because it is conventional solid state logic. This control logic on the control card stores the number of rings required before a subscriber line 30 is answered; counts the number of rings on a ringing line and compares this number with the threshhold stored. It also can receive and acknowledge eight basic digital messages:

Connect line *x* to trunk *y*;
take line *x* off-hook;
place line *x* on-hook and disconnect from trunk *y*;
deactivate all lines and trunks;
load ring count;
send ring count;
ring out compares;
ring count exceeds present by two.

The central site concentrator and control unit 38 operates similarly to the remote site concentrator and control unit 32 except for certain basic differences. Primary among these is the absence of any ring detection logic, ring count logic, off-hook and related digital messages. Hence the central concentrator and control unit 38 needs to receive and acknowledge only three basic digital messages:

connect;
disconnect;
reset.

Thus the central site concentrator 102 is basically a large switching matrix, in the preferred embodiment, a 128-to-64 switch, utilizing the same analog multiplexer 120 as a switch, as in the remote site concentrator 32.

System operation:

A typical step-by-step sequence of events for a normal call routed through the telephone answering system 20 may be described as follows System 20 is a telephone answering system having a number of subscriber 22 connected thereto. Each subscriber furnishes the system 20 with basic information such as the way he wishes his line answered, what type of message to take, what questions to ask callers and after how many rings he desires to have the telephone answered. All this subscriber information is stored in central site computer 44. Periodically central computer 44 will send digital messages to each remote site control unit 64 indicating predetermined number of rings for each subscriber line 30 connected to its concentrator 32. Remote control unit 64 constantly scans all subscriber lines 30 for a ringing condition. When a line 30 is detected as ringing, a ground appears at the ring detection multiplexer in remote control unit 64. At this point, the ring is indicated to the remote site control unit buffer memory 98 which retrieves a word with answer instructions from its memory, increments a bit to count the rings, and compares the results to the predetermined number of rings required for answering the line. If the prescribed number of rings has not been met, no message is sent to the central site computer 44 and the control unit 64 goes on to scan the next line.

If the threshhold of the predetermined number of rings has been met, then the remote site control unit 64 outputs a control message over its control line 70 to the central site computer 44 stating that the ringing line has met the threshhold for being answered. Upon receipt of this message the central computer 44 does a table lookup to determine which trunk lines 34 are available to the central site concentrator 38 and which operator position 42 is available. The computer 44 then determines a path through both concentrators 60, 102 to an available operator position 42 and communicates its switching instruction to each concentrator 60, 102 via the digital code discussed supra, i.e., addressing code on bits TR0–TR2.

At the same time a Connect bit is sent which clocks the trunk access bits into the D flip flops 129 which have been properly enabled by the Fairchild 9334 eight bit latches 128. When the trunk address codes have been loaded, a signal is sent to the central site computer 44 to that effect. The computer 44 checks to see if the proper connection has been made, notifies one of the operator positions 42 off an in-coming call, and displays the necessary information on its CRT visual display 112, including the subscriber master record, answering instructions and a complete format. The operator presses an off-hook button which is sent through the computer 44 to the appropriate remote site line card 90 along with the trunk address code and the Connect signal. The Connect signal again locks all data into the D flip flops 129 including the off-hook data bit. The off-hook relay is pulled in and the operator can then talk with the in-coming caller. The operator keys in any messages, completes the call an signals the computer 44 that the call has been completed by hitting a function key on the keyboard 110, sending a disconnect signal through the computer 44 to the remote site line cars 90. This resets all the flip flops 129 and disconnects the communications path through the analog switching matrix 60. It is seen, then, that the ten data bits D0–D9 plus the trunk address codes determine exactly which analog switching path is chosen. Meanwhile, the message is first stored in the controller 114 unti the computer 44 has time and channels available to request it. After being sent to the computer 44, the message is stored in disk memory.

If the call should be from a subscriber, either calling for his messages or to change his instructions, the operator first requests his identification number which she keys into the computer 44. Upon verification of identity, the computer 44 sends the stored message for the subscriber to the operator cathode ray tube visual display 112 for display and reading to the subscriber, one at a time. After each message the operator indicates to the computer 44 whether that message has been delivered to the subscriber. The computer 44 then marks the delivery record and creates a billing record.

If the subscriber desires to change his instructions, the computer 44 will output to cathode ray tube visual display 112 the old instructions and a format for new instructions. The operator then fills out the format with the keyboard 110 and enters this data into computer 44, which updates its files.

As illustrated in FIGS. 2 and 8, all the control functions are backed up by alternate equipment. All the computer programs have error checking routines. If control messages are not received by a given unit or are not acknowledged within a predetermined time limit, the message sequence is reinitiated. If there is a failure on the second try, the back-up equipment is switched in automatically.

The following tables illustrate the source and destination of each of the digital messages utilized in system 20 and described in the preceding paragraphs. In these tables the term "Processor" refers to the central processing unit (CPU) of computer 44; the term "CRT" refers to the cathode ray tube visual display 112; "Central" refers to the central site concentrator and control unit 38; "Remote" refers to the remote site concentrator and control unit 32.

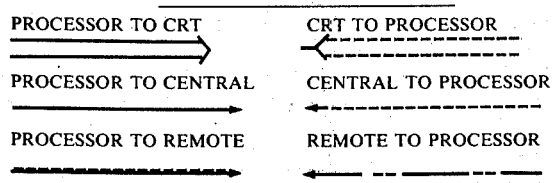

EXPLANATION OF SYMBOLS

PROCESSOR TO CRT / CRT TO PROCESSOR
PROCESSOR TO CENTRAL / CENTRAL TO PROCESSOR
PROCESSOR TO REMOTE / REMOTE TO PROCESSOR

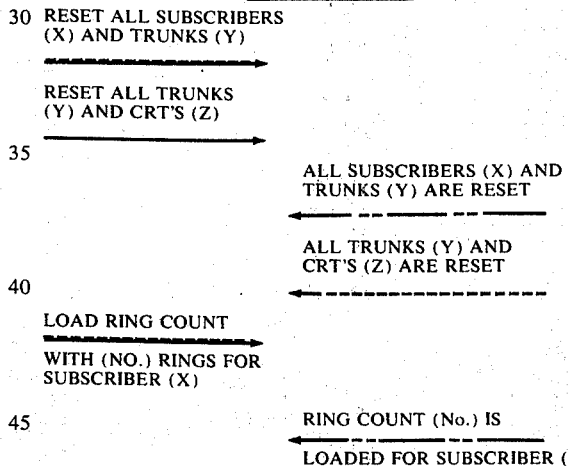

TABLE I

INITIALIZATION

RESET ALL SUBSCRIBERS (X) AND TRUNKS (Y)

RESET ALL TRUNKS (Y) AND CRT'S (Z)

ALL SUBSCRIBERS (X) AND TRUNKS (Y) ARE RESET

ALL TRUNKS (Y) AND CRT'S (Z) ARE RESET

LOAD RING COUNT WITH (NO.) RINGS FOR SUBSCRIBER (X)

RING COUNT (No.) IS LOADED FOR SUBSCRIBER (X)

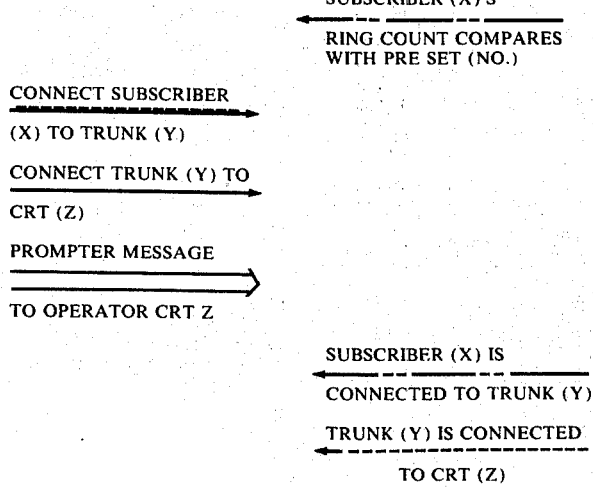

TABLE II

NORMAL OPERATION

SUBSCRIBER (X)'S RING COUNT COMPARES WITH PRE SET (NO.)

CONNECT SUBSCRIBER (X) TO TRUNK (Y)

CONNECT TRUNK (Y) TO CRT (Z)

PROMPTER MESSAGE TO OPERATOR CRT Z

SUBSCRIBER (X) IS CONNECTED TO TRUNK (Y)

TRUNK (Y) IS CONNECTED TO CRT (Z)

TABLE II-continued
NORMAL OPERATION

OPERATOR POSITION (Z)
     ← - - - - - - - - - - - - - - - - -
     IS READY FOR THE CALL

TAKE SUBSCRIBER
━━━━━━━━━━━━━━▶
(X) WHO IS CONNECTED
TO TRUNK (Y) OFF HOOK

SUBSCRIBER (X)
     ◄─ ─ ─ ─ ─ ─ ─ ─
     WHO IS CONNECTED TO TRUNK
     (Y) IS OFF HOOK

THE OPERATOR (Z) IS NOW IN VOICE COMMUNICATION WITH
 SUBSCRIBER (X) AND IS TYPING IN THE MESSAGE ON THE
 CRT

NORMAL MESSAGE
     REQUEST FOR DATA
     ← - - - - - - - - - - - - - - - - -
     INPUT SERVICE FOR OPERATOR
     (Z) & TERMINATE COMMAND

POLL CRT FOR
━━━━━━━━━━━━━▶
OPERATOR (Z)

CRT (Z) DATA
     ← - - - - - - - - - - - - - - - -
     MESSAGE

DISCONNECT SUBSCRIBER
━━━━━━━━━━━━━━━━━━━▶
(X) FROM TRUNK (Y) AND
PLACE SUBSCRIBER (X) ON
HOOK
DISCONNECT TRUNK (Y)
━━━━━━━━━━━━━━━━━▶
FROM CRT (Z)

CLEAR OPERATOR (Z)
━━━━━━━━━━━━━━━━━▶
SCREEN TO FORMAT

SUBSCRIBER (X) IS
     ◄─ ─ ─ ─ ─ ─ ─
     DISCONNECTED FROM
     TRUNK (Y) AND IS ON HOOK

TRUNK (Y) IS DISCONNECTED
     ◄─ ─ ─ ─ ─ ─ ─ ─ ─ ─ ─ ─ ─
     FROM CRT (Z)

TABLE III
DIAGNOSTIC

IF AN OFF HOOK COMMAND IS NOT SENT TO THE PROCESSOR
BEFORE THE RING COUNT IS THE PRESET COUNT PLUS TWO
RINGS THE FOLLOWING MESSAGE WILL BE SENT BY THE
REMOTE CONCENTRATOR

RING COUNT FOR
     ◄─ ─ ─ ─ ─ ─ ─ ─
     SUBSCRIBER (X) EXCEEDS
     THE PRESET COUNT NO. BY
     TWO RINGS

IF THE PROCESSOR WISHES TO CHECK THE PRESET
 SUBSCRIBER RING COUNT NO. THE FOLLOWING COMMAND IS SENT

SEND SUBSCRIBER (X)'S
━━━━━━━━━━━━━━━━━▶
RING COUNT

SUBSCRIBER (X)'S
     ◄─ ─ ─ ─ ─ ─ ─
     RING COUNT IS NO.

TABLE IV

NORMAL OPERATION ALTERNATIVES
WHEN THE OPERATOR IS IN VOICE CONTACT WITH THE SUBSCRIBER, RETRIEVAL FORMATS, ORDER FORMATS OR SPECIAL FORMATS CAN BE SOLICITED BY HITTING THE APPROPRIATE KEYS ON CRT (Z).

The following tables further illustrate a basic program and its relation to software structure providing the regulation of system 20.

Table I-A represents the overall design of the software structure.

Table II-A illustrates foreground processing of interrupts in system 20.

Table III-A illustrates executive level processing initiating the applications level processing of system 20, terminating foreground processing, and preparing system 20 for call acceptance.

Table IV-A illustrates the message flow through system 20 during normal operation as controlled by the central processing unit.

Table V-A illustrates the sequence of events of the program of system 20 when a call is received.

Table VI-A illustrates non-call application programs of system 20 which is needed for proper system functioning.

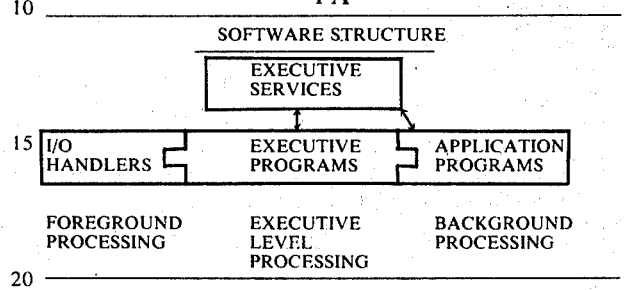

I-A

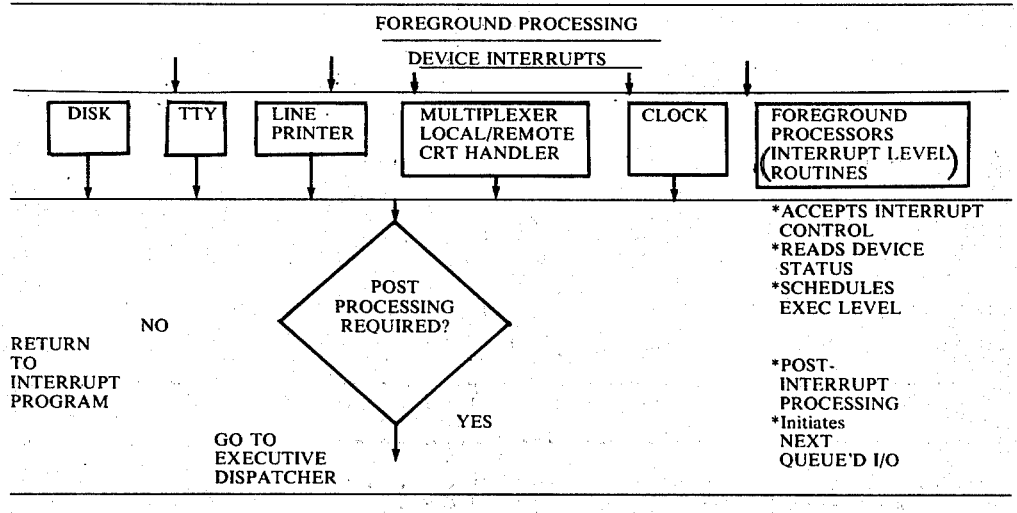

II-A

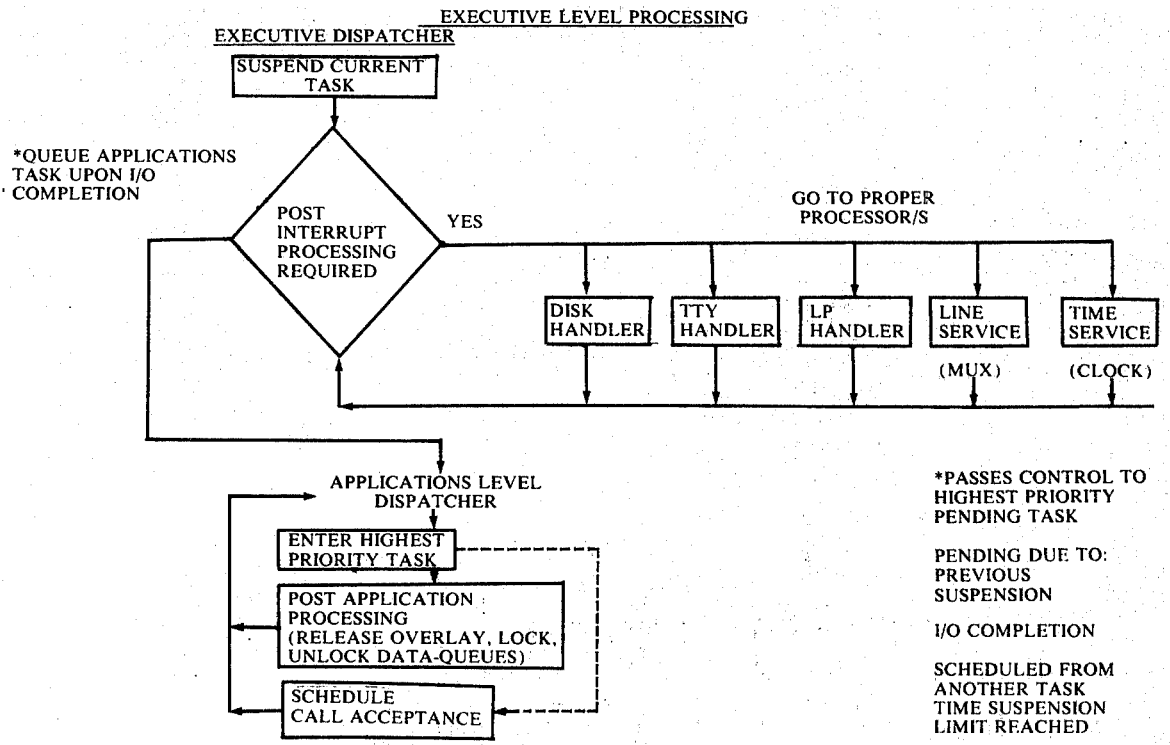

III-A

III-A-continued

EXECUTIVE LEVEL PROCESSING

EXECUTIVE SERVICES
*GET/RELEASE BUFFERS FROM BUFFER POOL
*GET/PUT BYTES FROM/TO BUFFERS
*QUEUE I/O TO DEVICE HANDLER
*QUEUE WORK FROM TASK TO TASK
*READ IN OVERLAYS

---

IV-A

MESSAGE FLOW

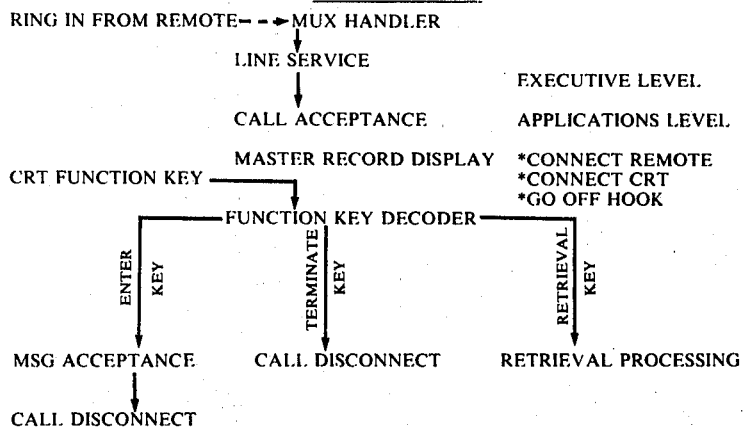

```
RING IN FROM REMOTE---→MUX HANDLER
                        ↓
                      LINE SERVICE
                        ↓                      EXECUTIVE LEVEL
                      CALL ACCEPTANCE          APPLICATIONS LEVEL
                      MASTER RECORD DISPLAY    *CONNECT REMOTE
CRT FUNCTION KEY ─────┐                        *CONNECT CRT
                      │                        *GO OFF HOOK
                      └── FUNCTION KEY DECODER ──┐
         ENTER KEY │         TERMINATE KEY │        RETRIEVAL KEY │
                   ↓                       ↓                      ↓
         MSG ACCEPTANCE       CALL DISCONNECT        RETRIEVAL PROCESSING
                   ↓
         CALL DISCONNECT
```

---

V-A

CALL PROCESSING APPLICATION PROGRAMS

| CALL ACCEPTANCE (CAC) | MASTER RECORD DISPLAY (MRD) | INSTRUCTION RETRIEVAL | FUNCTION KEY DECODER (FKD) |
|---|---|---|---|
| *LOOKS AT QUEUE OF CALLS WHICH ARE READY FOR AN OPERATOR (RING COUNT VALUE HAS BEEN REACHED) | *DISPLAYS CUSTOMER INFORMATION ON CRT | *DISPLAYS ALL CURRENT INSTRUCTIONS HAVING TO DO WITH THIS ACCOUNT ON THE CRT | *SCHEDULED WHEN CONTROL KEY IS DEPRESSED ON A CRT |
| *ASSIGNS RESOURCES TO CALL* | *ISSUES REMOTE/LOCAL VOICE CONNECT | | *TRANSFERS CONTROL TO REQUIRED APPLICATIONS PROGRAM: |
| *ASSIGNS TRUNK ON REMOTE | *ISSUES CRT LOCAL VOICE CONNECT | | -RETRIEVAL |
| *GETS A "CALL CONTROL PACKET" WHICH CONTAINS ALL CONTROL INFORMATION ABOUT CALL | *ISSUES OFF HOOK | | -ENTER MESSAGE |
| *ASSIGNS AN AVAILABLE CRT | *PUTS CRT IN MODE WHICH WAITS FOR CRT KEYBOARD TO DETERMINE NEXT FUNCTION | | |
| *IF ANY RESOURCE IS UNAVAILABLE CALL IS LEFT ON QUEUE TO BE ASSIGNED RESOURCES WHEN AVAILABLE | *CALLS INSTRUCTION RETRIEVAL IF MORE THAN ONE INSTRUCTION FOR THE SUBSCRIBER | | |
| *SCHEDULES MASTER RCD DISPLAY | | | |

| MESSAGE ACCEPTANCE (MAC) | DISCONNECT | RETRIEVAL |
|---|---|---|
| *SAVES MESSAGES ON DISK FOR LATER RECALL BY RETRIEVAL | *ISSUES REMOTE/LOCAL DISCONNECT | *DISPLAYS ALL DELIVERED AND/OR UNDELIVERED MESSAGES FOR SUBSCRIBERS |
| *SCHEDULES DISCONNECT | *ISSUES CRT/LOCAL DISCONNECT *PUTS CRT ON | |

V-A-continued

CALL PROCESSING APPLICATION PROGRAMS

AVAILABILITY QUEUE
*PUTS CRT ON
AVAILABILITY QUEUE
*PUTS REMOTE TRUNK
INTO TRUNKS
AVAILABLE QUEUE

VI-A

NON-CALL APPLICATION PROGRAMS

| RECOVERY | INITIALIZATION COMMUNICATIONS | SNAP | REPORTS |
|---|---|---|---|
| *RESTARTS SYSTEM IN CASE OF SYSTEM FAILURE | SENDS RESET TO ALL REMOTES<br><br>*SENDS RESET TO LOCAL<br>*PUTS CANNED MESSAGE ACCEPTANCE FORMAT TO ALL CRTS | *SNAPS SYSTEM STATUS TO DISK | *PRINTS SYSTEM STATUS REPORTS |

| DIAGNOSTICS | MASTER RECORD BUILD | SUBSCRIBER ON/OFF | SUPERVISORY COMMANDS |
|---|---|---|---|
| *SENDS DIAGNOSTIC COMMANDS TO EVERY REMOTE<br><br>*DETERMINES STATUS OF REMOTE<br><br>*ISSUES RESET IF FAILURE OCCURS | *ADDS NEW ACCOUNTS INTO SYSTEM | *PUTS SUBSCRIBER PHONE ON/OFF LINE DEPENDING ON HOURS OF SERVICE | *PUTS REMOTES/CRTS OR TRUNKS IN OR OUT OF SERVICE<br><br>*ASSIGNS AN OPERATOR TO A CRT<br><br>*SENDS RING COUNTS TO REMOTES JUST PUT INTO SERVICE SERVICE<br><br>*RESETS RING COUNT ON ANY INDIVIDUAL SUBSCRIBER |

| HISTORIC FILE CREATE |
|---|
| *PUTS OLDEST MESSAGE TO THE HISTORIC FILE FREEING THE MESSAGE DISK |

Thus it will be seen that the system of the present invention provides a feasible and economical solution to the technical anad cost problems involved in a large scale telephone answering service. The use of unmanned, remote trunk concentrators located adjacent to telephone company central offices provide a reduction of 64 to one in trunk line costs to a large centralized answering service. The use of a central concentrator provides a further cost reduction of two-to-one in operator labor and equipment costs for operator positions. The elimination of electromechanical switchboards and the use of a computer controlled electronic switching enabling any one of 8192 subscriber lines to be switched to any operator provides a flexibility not otherwise available. The use of single wire analog switching reduces the number of switches to one-half, providing a significant reduction in switching costs. With the multiplication of various units of equipment, the system of the present invention is capable of expansion to serve millions of subscribers over a wide geographic area at minimal costs.

It is to be understood that the above-described embodiments are but illustrative of the application of the principles of this invention. Numerous other arrangements and application may be devised by those skilled in the art without departing from the spirit and scope of the invention.

I claim:

1. A computer controlled telephone answering system serving the subscribers of at least one telephone company central office comprising:
    a remote site in close geographic proximity to said telephone companay central office;
    a central site at which the telephones of subscribers are actually answered, said central site serving at least one remote site;

a digital computer and communications center located within said central site for supervision and control of said telephone answering system including regulation of said remote sites and for storing and retaining subscriber information within said system;

at least one remote site trunk concentrator and control unit located at each remote site;

a plurality of answering service subscriber lines connected from said telephone company central office to said remote site concentrator and control unit;

at least one central site concentrator and control unit located at said central site;

a plurality of trunk lines from each of said remote site concentrator and control units to said central site concentrator and control unit, the number of said trunk lines being substantially less than the number of said answering service subscriber lines;

said remote site concentrator and control unit having switching capability to switch any of said incoming subscriber lines through said remote site concentrator to any of said outgoing trunk lines leading to said central site concentrator and control unit, thus reducing the number of trunk lines connected to said central site answering said subscriber telephones;

a plurality of telephone answering operator positions within said central site, the number of said telephone answering operator positions numbering less than the number of said trunk lines entering said central site concentrator, each of said telephone answering operator positions connected to said central site concentrator;

said central site concentrator and control unit having capability to switch any of said trunk lines through said central site concentrator to any of said telephone answering operator positions;

digital data transmission means connected to said remote site concentrator and control unit, said central site concentrator and control unit and said digital computer;

a digital computer located within said central site for supervising the control, line selection, and switching functions relating to said system, and for storing and retaining subscriber information within said system;

said remote site concentrator and control unit including ring detection means for repeatedly and sequentially scanning each of said subscriber lines to ascertain which of said subscriber lines are in active ringing condition;

said remote site concentrator and control unit having digital transmission means associated with and responsive to said remote site concentrator and control unit ring detection means;

said digital transmission means connected to said central site control unit for transmitting an identifying digital signal to said central site control means upon the detection of a ringing subscriber line;

said digital computer connected to said central site digital transmission means through said central site control unit for receiving an identifying digital signal upon detection of a ringing subscriber line;

said computer interconnected to said remote site concentrator and control unit and said control site concentrator and control unit through said digital transmission means for establishing a subscriber line path through said remote site concentrator and said central site concentrator to said telephone answering operator positions;

said remote and central site digital control units having memory units;

a buss switch connecting said remote and central concentrators to said control and memory unit;

a primary remote-site communications logic controlling digital data transfers to and from said remote site;

a remote site digital means transfering said data to and from said remote site;

a dedicated control trunk line connecting said remote and central sites carrying said data;

said telephone answering operator positions being connected with said central site concentrator and said data being directed through a proprity controller including a buffer memory and said positions also being interfaced through a multiplexer;

said central site concentrator and control unit having the capability to switch any of said trunk lines through said central site concentrator to any of said telephone answering operator positions.

2. The apparatus of claim 1 wherein said telephone answering operator positions comprise:

a keyboard for entry of data signals in digital form by the operator;

means for the visual display to the operator of data entered from said keyboard or sent from said digital computer;

a controller interfacing with said keyboard, said visual display and said central site digital computer, said controller being responsive to digital command signals from said keyboard and said digital computer, and said controller having a digital memory unit;

telephone trunk lines from said central site concentrator to said operator position to enable said operator to answer subscriber telephone lines, and to originate telephone calls; and all of said operator position equipment being controlled by said central site computer.

3. The computer controlled telephone answering system as defined in claim 1 wherein said remote site concentrator and control unit further includes:

remote line control cards having a ring detection logic providing means for ring detection and means to electrically count the number of rings upon each subscriber line;

a line address decoder to determine the appropriate connection of a ringing subscriber line through said remote site concentrator;

a digital memory for storing a number representing the predetermined number of rings required to answer a subscriber line, thus providing a basis to report ring, offhook and on hook status of each of said subscriber lines;

a timing set providing means to coordinate the activities of aforesaid remote site concentrator particularly in scanning said subscriber lines and in relaying data through said remote site concentrator;

a concentrator address decoder acting in conjunction with said central site computer determining available trunk lines and paths for transference of incoming and outgoing subscriber calls between said remote site concentrator and said central site concentrator;

a digital memory including a buffer, comparing and matching subscriber data with data from said ring detect logic, said line address decoder, said timing set and said concentrator address decoder, said buffer being a temporary storage of data necessary to activate said system with respect to a particular subscriber line;

an electrical counting means to count the number of rings on each subscriber line;

a comparison means to determine whether an actual number of rings on any subscriber line meets a predetermined number of rings required for answering said subscriber line;

a remote site data set to receive and transmit digital messages between said remote site and said central site;

a line interface communicating with said buffer memory and said timing set;

a trunk line from said remote site data set to said central site for high speed transmission and receipt of said digital data messages; and at least one trunk line from said remote site concentrator communicating said incoming and outgoing subscriber calls.

4. The computer controlled telephone answering system as defined in claim 3 wherein said remote site concentrator and control unit means to scan said subscriber lines comprises:

a ring wire connected to ground;

means for scanning on a periodic basis for a ground on each subscriber line caused by a control closure in said subscriber telephone circuit resulting from a ring signal.

5. The computer controlled telephone answering system as defined in claim 3 wherein said means at said central site responsive to the receipt of said digital information concerning the ringing condition of a subscriber line comprises:

a data set at said control site control unit capable of receiving and transmitting messages;

said digital computer at said central site interconnected to said remote site control unit and said central site control unit capable of interpreting said digital messages and initiating digital commands in response thereto.

6. The computer controlled telephone answering system as defined in claim 1 wherein said digital computer at said central location further includes:

digital memory units for storage and retrival of all information pertinent to answering subscriber telephones and for storing and retrieving all messages for said subscribers.

7. The computer controlled telephone answering system as defined in claim 1 wherein said remote site concentrator control unit further includes:

a digital memory for storing a number representing the predetermined number of rings required to answer a subscriber line; and electrical counting means to count the number of rings on each subscriber line;

comparison means to determine whether an actual number of rings on any subscriber line meets a predetermined number of said rings required for answering said subscriber line;

a set of digital messages in said digital memory pertaining to each subscriber line;

at least one trunk line from said remote location to said central location for high speed digital transmission of said digital messages and receipt of response to said digital message; and a data set to transmit digitally said digital messages to and from central site location.

8. The apparatus of claim 1 wherein said remote site concentrator comprises an analog matrix switching array.

9. The apparatus of claim 1 wherein said central site concentrator comprises an analog matrix switching array.

10. The apparatus of claim 1 wherein said remote site and central site concentrators further comprise:

a plurality of telephone trunk lines entering said concentrators;

a pluality of telephone trunk lines exiting from said concentrators; the number of said exiting trunk lines being substantially less than the number of trunk lines entering thereto a plurality of digital control circuits for the control and operation of said trunk concentrator, with at least one digital control circuit for each of said entering trunk lines;

a switching matrix whereby any one of said entering trunk lines may be interconnected to any one of said exiting trunk lines;

a bidirectional analog multiplexer in said digital control circuits associated with each individual entering line;

the tip wire of each entering trunk line being connected to the input of said analog multiplexer, and the ring wire of each entering trunk line being grounded;

the tip wire of each exiting trunk line being connected to the output side of said analog multiplexer;

said analog multiplexer thereby serving as a single wire analog switch for interconnecting any entering trunk line to any outgoing trunk line;

means responsive to a digital command to connect a particular entering trunk line to a particular exiting trunk line such that said digital control circuit for that entering trunk line is enabled, thereby connecting said entering trunk line to an available exiting trunk line;

said concentrators thereby being matrices of single wire bidirectional analog switches, and available electrical paths through said matrices being determined by said digital computer.

* * * * *